United States Patent [19]
Ohotsubo et al.

[11] 3,928,099

[45] Dec. 23, 1975

[54] PROCESS OF PRODUCING PRESSURE SENSITIVE RECORDING SHEETS

[75] Inventors: Hiro Ohotsubo; Suguru Fujikura; Yoshimitsu Miyata, all of Ibaragi, Japan

[73] Assignee: Oji-Yuka Synthetic Paper Company, Ltd., Tokyo, Japan

[22] Filed: Apr. 30, 1973

[21] Appl. No.: 355,379

[52] U.S. Cl. .................. 156/83; 156/244; 264/289; 264/343; 428/304;DIG. 910
[51] Int. Cl.² ........................................ B32B 27/24
[58] Field of Search ............ 156/229, 83, 84, 85, 86; 161/168, 162; 264/342 R, 210 R, 343, 288, 289; 428/304, DIG. 910

[56] References Cited
UNITED STATES PATENTS

| | | | |
|---|---|---|---|
| 3,737,354 | 6/1973 | Hattori................................ | 156/229 |
| 3,773,608 | 11/1973 | Yoshimura et al. ................ | 156/229 |
| 3,783,088 | 1/1974 | Yoshiyasu et al................... | 156/229 |
| 3,790,435 | 2/1974 | Tanba et al.......................... | 156/229 |

FOREIGN PATENTS OR APPLICATIONS 24,797     1971     Japan

*Primary Examiner*—Douglas J. Drummmond
*Assistant Examiner*—Jerome W. Massie
*Attorney, Agent, or Firm*—Sughrue, Rothwell, Mion, Zinn & Macpeak

[57] ABSTRACT

A process for making a self-contained pressure-sensitive recording sheet. A colored thermoplastic resin substrate having adhered thereto a styrene polymer layer having dispersed therein fine particles of a temporarily deformed rubbery polymer is contacted with a swelling (softening) agent for the styrene polymer layer which permits the deformed rubbery polymer particles to return to their original shape. At least the surface of the styrene polymer layer is rendered opaque. In one embodiment, the swelling agent contains an additional liquid component which increases the crushability of the styrene polymer layer, whereby superior recording is achievable. In another embodiment, the styrene polymer layer having the fine particles of rubbery polymer dispersed therein contains an additional resin component which renders the layer more easily crushable. The additional liquid component and resin component must meet certain criteria as described in the specification.

103 Claims, 17 Drawing Figures

PROCESS OF PRODUCING PRESSURE SENSITIVE RECORDING SHEETS

BACKGROUND OF THE INVENTION

1. Field of the Invention

The present invention relates to a process of producing a pressure-sensitive recording sheet capable of duplicating letters, marks, patterns, figures, etc. upon the application of local pressure to the pressure-sensitive recording sheet. More particularly, this invention relates to a process of producing a pressure-sensitive recording material comprising a synthetic paper prepared by converting a surface of a synthetic resin film into a microporous opaque layer. Still further, the invention relates to a process of producing a self-marking (autogenous) type pressure-sensitive recording sheet by converting at least the surface of a synthetic resin film laminated on a colored synthetic resin sheet into a crushable microporous opaque layer.

2. Description of the Prior Art

Pressure-sensitive recording papers or sheets have mainly been used as pressure-sensitive manifold papers and various types of such pressure-sensitive manifold papers are known. Among these papers carbonless paper has recently been used most advantageously since it does not suffer from a tendency to stain.

The most typical carbonless system is a unit composed of a sheet A having a layer capable of being colored by the reaction with layers coated on another sheet B, for example, a sheet A having a layer of microcapsules containing a colorless dye capable of being colored by donating electrons and a sheet B having thereon a layer capable of causing a color forming reaction with the layer on sheet A, typically a layer of active clay as an electron-acceptor. Although such a carbonless paper is convenient, it has disadvantages, for example, when an A surface faces another surface A (or a B surface faces another B surface) by mistake, no coloring or marking is obtained; when the A sheets and the B sheets are stored in a piled condition, the surfaces of the B sheets tend to be colored or fogged by the reaction of the composition of the A sheets and the composition of the B sheets with each other; printing is difficult due to the occurence of paper deformation with changes in humidity; carbonless papers have an unpleasant ordor; and carbonless papers are quite expensive.

One known pressure-sensitive paper includes a strippable type paper which is composed of a strippable sheet prepared by forming a white protective layer on a colored substrate to mask the colored surface of the substrate (surface A) and a sheet having wax coated thereon (surface B). When both sheets are locally pressed in such a state that surface A is brought into contact with surface B, the protective layer on surface A adheres locally at the pressed portions to surface B and is stripped off from the surface of the substrate to loccally reveal the colored surface of the substrate. However, a system of this type is accompanied by disadvantages, i.e., it requires a pair of sheets and also when the sheet having surface A is folded the protective layer is stripped off the reveal the colored surface of the substrate or, when the sheet is folded after use, the marks obtained by duplication become unclear.

In addition to the aforesaid pressure-sensitive papers mainly composed of cellulosic fibers, pressure-sensitive or heat-sensitive papers or sheets composed of synthetic resin films utilizing the specific properties of the synthetic resin films are known. By treating the surface of a synthetic resin film with a solvent for the resin, a white opaque layer is formed on the surface of the film. When heat and/or pressure is locally applied to the white opaque layer of the film, the opaque layer is locally ruptured or crushed to become transparent.

A pressure-sensitive or heat-sensitive paper of this type can be prepared by applying to a synthetic resin film a solvent treatment process which is one of the processes of producing synthetic papers from sythetic resin films. However, such pressure-sensitive paper is still unsatisfactory because the white opaque layer is comparatively tough and is not easily ruptured or crushed, i.e., when a mark is duplicated onto several piled pressure-sensitive papers of this type by applying local marking pressure, clear duplications cannot be obtained since the white opaque layers of the papers are not easily crushed or ruptured by the marking pressure. On the other hand, if the thickness of the white opaque layers is decreased this results in revealing the color of the substrate over the entire surface thereof, and thus, in such a case, the appearance of the duplication is degraded and further the contrast of the duplicated marks can become so inferior that they are unreadable.

SUMMARY OF THE INVENTION

According to the present invention, there is provided a process of producing a pressure-sensitive, self-contained (autogenous) recording sheet. A styrene polymer film having fine particles of rubbery polymer dispersed therein is used. At least the styrene polymer film having fine particles of a rubbery polymer dispersed therein is stretched so the fine particles of rubbery polymer dispersed therein are temporarily "flattened". The surface of the styrene polymer film containing the fine particles is swollen with a swelling agent to render the surface of the styrene polymer film containing the fine particles opaque. The swelling agent "softens" the styrene polymer film so the "flattened" particles of rubbery polymer can return to their original shape. The styrene polymer film is used on a colored resin substrate, which can be joined to the styrene polymer film prior to, during or after the processing sequence, so long as the colored resin substrate is present at the time of use. Upon the application of writing pressure a visable mark results because the opaque layer of the styrene polymer film is easily crushed to expose the colored resin substrate. In the process, an additional component is added to the styrene polymer film containing fine particles of rubbery polymer which renders the styrene polymer film more easily crushable, and/or a component is added to the swelling agent which renders the styrene polymer film containing the fine particles of rubbery polymer more easily crushable.

The objects of the present invention are thus to provide a superior autogeneous pressure-sensitive recording sheet and a simple yet reliable process for producing the same.

DETAILED DESCRIPTION OF THE INVENTION

Figure 1:
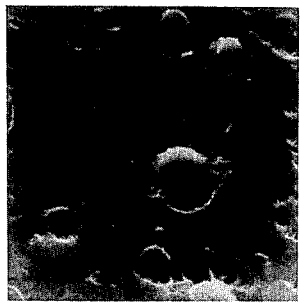
FIGS. 1 and 2 are surface views showing microvoids.

The film of the present invention can be processed in the sequences (1) laminate, stretch and swell (swelling composition treatment); (2) stretch, laminate and swell; or (3) stretch, swell and laminate, and equivalents thereof. However, since the most easily performed sequencing is (1), most of the following discussion will be in terms of such a sequence.

The present invention will now be described in greater detail.

1. Laminate film:

The laminate film of this invention is prepared by adhering to at least one surface of a colored resin film (B) a film (S), and film (S) is at least uniaxially stretched.

(1) Film (S):

Film (S) is formed of a styrene polymer having uniformly dispersed therein fine particles of a rubbery polymer. The styrene polymer film is composed of a continuous phase (matrix and a dispersion phase. The continuous phase is mainly composed of a styrene polymer (hereinafter often referred to as a "matrix styrene polymer" or "matrix polystyrene") and the dispersion phase is composed of fine particles of a rubbery polymer which are almost spherical prior to stretching.

The matrix styrene polymers which can be used in the present invention include both homopolymers of styrene and copolymers of styrene and one or more monomers copolymerizable therewith.

As examples of the aforesaid monomers polymerizable with styrene the following olefins can be used:
  a. halogen-substituted styrenes such as chlorostyrene, bromostyrene, dichlorostyrene, including haloalkylstyrenes such as methyl chlorostyrene, etc;
  b. vinyl alkylaryl monomers such as alkyl-substituted styrenes and vinyl naphthelene derivatives; for example, α-methylstyrene, vinyltoluene, ethyl vinylbenzene, butyl vinylbenzene, hexyl vinylbenzene, stearyl vinylbenzene, dimethyl vinylbenzene, vinylnaphthalene, methyl vinylnaphthalene, etc;
  c. vinyl alkoxyaryl monomers such as methoxy vinylbenzene, ethoxy vinylbenzene, butoxy vinylbenzene, etc. As representative of olefins copolymerizable with styrene other than the aforesaid vinylaryl derivatives, the following olefins can also be used:
  a. halogen-substituted vinyl compounds such as vinyl chloride and vinyl fluoride;
  b. acrylic acids such as acrylic acid, methacrylic acid, chloroacrylic acid, β-cyanocrylic acid;
  c. acrylic acid esters such as methylacrylates, ethylacrylates, methylchloroacrylates, fluorophenylacrylates, methyl-β-cyanacrylates, etc.;
  d. nitrile derivatives of olefin unsaturated acids such as acrylic acid, methacrylic acid and chloroacrylic acid; for example, acrylonitrile, methacrylonitrile, chloroacrylonitrile, fumarocrylonitrile, etc.;
  e. acryl derivatives such as acetic acid acryl compounds;
  f. esters of dicarboxylic acids such as maleic acid, fumaric acid and itaconic acid, for example, monomethylmaleates, dimethylmaleates, methylfumarates, isopropylfumarates, ethylitaconates, etc.;
  g. vinyl ethers such as vinylmethyl ether, vinylphenyl ether, etc.

The concentration of the aforesaid monomers co-polymerizable with styrene is less than 50 ml% in the copolymer, preferably less than 10 mol%.

The above materials are only representative of the many styrene homopolymers and copolymers which can be used with success in the present invention.

Preferred matrix styrene homopolymers, copolymers of mixtures thereof have a molecular weight, GPC weight average, of about 150,000 to about 400,000, more preferably 200,000 to 300,000; a Vicat softening point (ASTM D-1525) of 80° to 110°C; and a Rockwell hardness (ASTM D-785) HrM of 80 to 100.

As the fine particles of a rubbery polymer uniformly dispersed in the matrix styrene polymer as described above, any desired rubbery polymer having at least some elasticity can be used. The fine particles should have the capability of being deformed by stretching and returning to their original form upon release of the stretching strain. While complete return is not necessary, it will be obvious that the greater the tendancy to return, the greater will be the microvoid formation.

As the rubbery polymer of fine particles uniformly dispersed in the matrix styrene polymer as described above, any rubbery polymer having a Mooney viscosity (ML 1 4 (100°C)) of about 20 – about 50 preferably 30 – 60, can, of course, be used.

Examples of such rubbery polymers commonly used include:
  a. synthetic unsaturated rubbery copolymers of $C_4$ - $C_6$ conjugated diolefins such as styrene-butadiene copolymers, acrylonitrile-butadiene copolymers, isobutylene-isoprene copolymers, isobutylene-2,3-dimethylbutadiene copolymers, isobutylene-2,3-dimethylbutadiene copolymers and polychloroprene.
  b. 1.4 - polybutadiene and polyisoprene having a cis-content of at least 25% and a terminal vinyl-content of less than 10%, or rubbery homopolymer and polymer mixtures including the same.
  c. rubbery polymers of $C_3$ - $C_4$ monoolefins such as ethylene-propylene rubbers, ethylene-propylene-unconjugated polyene monomers and the like, exemplified by dichloropentadiene, cyclooctadiene-1,5, methyltetrahydroinden and the like, and epichlorohydrin-ethylene oxide rubbers.

This listing is not limitative, and it should be clear to one skilled in the art that a listing of all appropriate rubbery polymers would be impossible.

It is preferable that the average particle diameter of the fine particles range from about 0.1 to about 10 microns, preferably about 1 to about 5 microns, with an average number of more than 50%, preferably more than 80%, of the fine particles having a particle diameter of from about 0.1 to about 10 microns. Generally speaking, it is most preferred that no significant amount of fine particles have a size greater than 20μ or a size smaller than about 0.1μ, since as greater amounts of fine particles of this type are present the writing capability becomes lessened.

The content of the rubbery polymer is suitably about 1 to about 15 percent by weight, preferably about 4 to about 8 percent, based on the weight of the styrene polymer containing fine particles of the rubbery polymer.

The styrene polymer having such a fine particle-matrix structure can be prepared in the following manner. For example, the polymer can be prepared by polymerizing or copolymerizing the styrene monomer, etc., after dissolving or finely dispersing therein the rubbery polymer described above. In this case, the polymerization can be a bulk polymerization, a suspension polymerization, or other polymerization method which is conventionally employed for the polymerization of styrene. A bulk-suspension polymerization as is disclosed in Japanese Patent Publication 22077/1965 is generally used. The fine particles of rubbery polymer in the styrene polymer prepared in such a manner are mainly composed of the rubbery polymer and styrene grafted to the rubbery polymer, and the polymer of styrene, etc., occluded in the particles. These graft systems are rather complex in nature, but they still retain their essential character of comprising a matrix styrene polymer with fine particles therein which are rubbery relative to the matrix styrene polymer. In another typical process of producing such a styrene polymer, the rubbery polymer and the matrix styrene polymer are first prepared separately and then the rubbery polymer is dispersed in the matrix styrene polymer by kneading, etc.. In the latter case, the fine particles are substantially composed of the rubber polymer only.

Additional matrix polystyrene-fine particles of rubbery polymer systems are disclosed and discussed in the Journal of Applied Polymer Science, Vol. 9, pp 2887 – 2894 (1965) and Vol. 11, pp 2361 – 2372 (1967). The graft systems disclosed therein are typical of those which can be used in the present invention, and both of these publications are hereby incorporated by reference. It should be noted that the former article uses the term "microgel" to describe the fine particles of rubbery polymer.

Suitable styrene polymer systems used in this invention are polystyrenes containing the fine particles of rubbery polymer which have a melt flow rate of about 0.1 to about 3 g/10 min. measured by ASTM-D-1238. Commercially available high impact resistant polystyrene (HI/PS) can be used as the polystyrene component to give a polystyrene-fine particle system having such a melt flow rate.

The styrene polymer used in this invention can contain a number of optional additives in the rubbery polymer and/or the matrix styrene polymer if the additives are blendable therein and do not adversely affect the objects of this invention. Examples of such additives include anti-oxidizing agents, antistatic agents and a flowability improving agents. They can be added in a manner known to the art in proper amounts depending upon the desired effect.

The fine particles of rubbery polymer uniformly dispersed in the matrix styrene serve a very important function in the present invention. When the matrix styrene film is stretched, the fine particles ae flattened and subjected to strain by the stretching. When the matrix styrene film is later swollen and softened, the fine particles of rubbery polymer tend to return to their original non-deformed form, where fine voids (microvoids) form in the volume which the deformed rubbery polymer occupied.

If fine particles of excess size are used this results in increasing the size of the microvoids. Accordingly, the number of microvoids per unit volume decreases and the whiteness drops.

Furthermore, when the distribution of the fine particles is nonuniform, the distribution of the microvoids is also nonuniform. As a result, the printability of the sheet becomes uneven.

Controlling the size, the distribution and the uniformity of voids in the layer composed of fine voids provided on the surface of the film is very important from various viewpoints, i.e., it is desired to obtain properties at least equal to those of a natural paper sheet such as markability and printability, which are largely controlled by surface whiteness, drying rate of inks thereon, reflective index of a printed plane and opacity after printing. Further, the color of the colored substrate film (B) should be masked by the opaqueing process (due to the irregular reflection) rendering the material white.

The present inventors discovered the fact that various requirements, i.e., the fine particles of a rubbery polymer(s) have a diameter of about 0.1 to about 10$\mu$, the content of rubbery polymer is about 1 to about 15% and the fine particles are uniformly dispersed in the matrix polystyrene, are closely related with controlling the size, distribution and uniformity of voids combined with the stretching of the film(s) and the swelling agent treatment.

The above facts will be apparent to one skilled in the art by referring to the attached drawings in light of the discussion offered below.

Deformation of Fine Particles and Appearance of Microvoids

In the case of flatly deforming and straining the fine particles composed mainly of rubbery polymer by stretching, when the matrix styrene polymer is later swollen and softened by contact with the swelling agent for the styrene polymer the strain is released and the fine particles are shrunk into their original form. As a result, voids form around the shrunken particles as shown in FIG. 1 to form a microporous opaque layer as an assortment of the voids as shown in FIG. 2.

Figure 2:
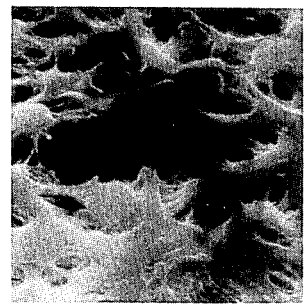

In more detail, FIGS. 1 and 2 illustrate the formation of microvoids in a surface layer where the stretching ratio was 9 at a stretching temperature of 123°C, the swelling agent was n-heptane at 53°C and the treating time was 2 seconds for the FIG. 1 Sample and 10 seconds for the FIG. 2 Sample. The magnification ratio was 1500X.

Size and Distribution of Fine Particles and Size and Distribution of Microvoids

Figure 3:
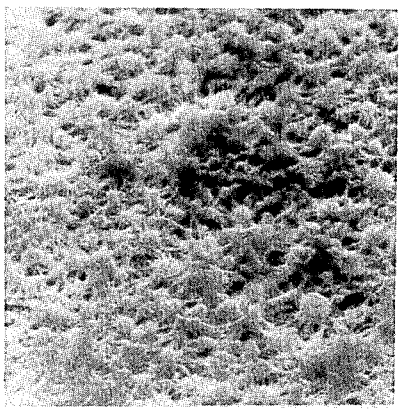
FIGS. 3 and 4 are surface views illustrating the effect of fine particle size variation on microvoid formation.
Figure 4:
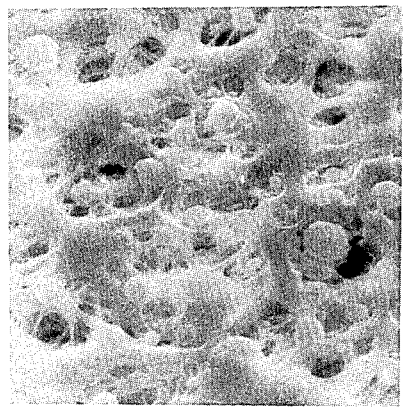

The size and distribution of fine particles are closely related with the state of the surface layer which is an assortment of microvoids, as shown in FIGS. 3 and 4. The samples of FIGS. 3 and 4 were formed at a stretching ratio of 9 and at a stretching temperature of 125°C, the swelling agent used was n-heptane and the temperature of swelling was 45°C. (Magnification ratio: 700X). In FIG. 3 the fine particles had a mean diameter of 4 – 5$\mu$ and the rubbery polymer content was 6 wt. %, while in FIG. 4 the fine particles had a mean diameter of 7 – 8$\mu$ and the rubbery polymer content was 6 wt. %.

The larger microvoid structure is easily seen in FIG. 4.

Relationship between the Degree of Stretching and the Microvoids

FIGS. 5 to 8 show the relationship between the degree of stretching and the state of the surface layer. The opaque surface layer obtained by masking the color of the colored substrate film in the laminated sheet product of this invention and the white appearance thereof is based on the irregular reflection of light due to the assortment of microvoids. The above irregular reflection of light effectively occurs at a stretching ratio over 6. (See FIGS. 7 and 8).

The difference in the state of the surface layer based on the stretching ratio can be appreciated by comparing the degree of deformation of an unswollen portion of the film containing fine particles to that of the fine particles in the surface layer after shrinking into the original form as shown in the sectional planes corresponding to each surface layer.

Figure 5:
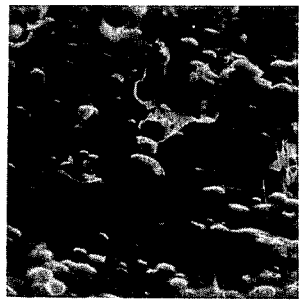
FIGS. 5 to 8 are surface views illustrating the effect of the stretching ratio on the fine particles.
Figure 6:
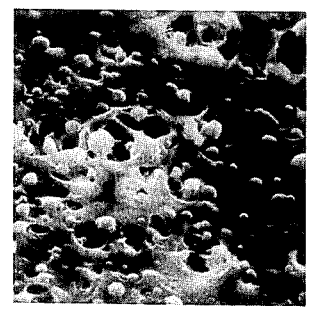
Figure 7:
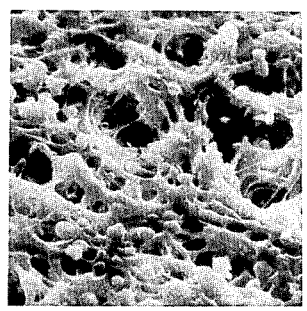
Figure 8:
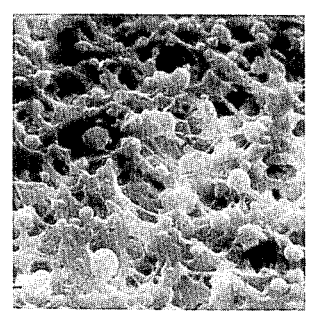
Figure 9:
FIGS. 9 to 12 are cross sectional views of the treated surface layer/untreated surface layer boundary of the materials of FIGS. 5 to 8, respectively.
Figure 10:
Figure 11:
Figure 12:

The samples photographed (magnification ratio: 500X) in FIGS. 5 – 8 were produced under the following conditions: the swelling agent was monochlorobenzene 15 volume %, n-heptane 85 volume %, the treating time was 15 seconds and the treating temperature was 20°C. The stretching ratios used were as follows:

| Figure 5: | 3.1 |
| Figure 6: | 4.4 |
| Figure 7: | 6.8 |
| Figure 8: | 7.8 |

The whiteness of FIGS. 7 and 8 (stretching ratio > 6) is easily seen as compared to FIG. 3 and 6 (stretching ratio < 6).

FIGS. 9 to 12 are cross sectional views of the treated surface layer / untreated surface layer boundaries of the materials whose surface is shown in FIGS. 5 to 8. The magnification in FIGS. 9 to 12 is 3500X. As the stretching ratio increases, the effect of swelling is clearly seen, i.e., "rebounded" fine particles in the surface layer versus still deformed particles in the surface layer part which was not contacted with the swelling composition.

Assuming the surface layer and substrate were basically of the same polymer materials and were both stretched and the entire surface layer swollen, this same effect would be seen between the treated surface layer and untreated substrate.

Figure 13:
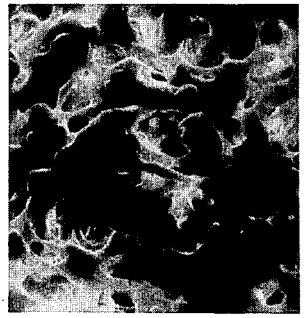
FIG. 13 is a surface view and FIG. 14 is a cross sectional view of a prior art recording sheet.
Figure 14:
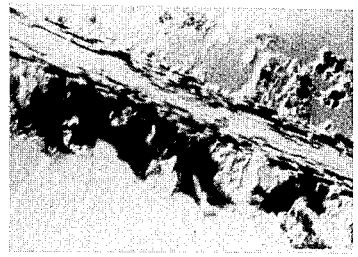

For purposes of comparison, FIGS. 13 and 14 are presented, FIG. 13 (500X) being similar in format to FIGS. 5 to 8 and FIG. 14 (290X) similar to FIGS. 9 to 12. This material was only treated with a swelling agent per se, i.e., though subjected to the other processing sequences it is easily seen that the lack of liquid component (II) or resin component (II) provides a vastly inferior product.

Having thus described the basic resin components used in the present invention, i.e., the matrix styrene polymer (or matrix polystyrene, these terms are used interchangably) and the fine particles of rubbery polymer which are uniformly dispersed therein, it is appropriate to turn to one major embodiment of the invention where a resin which renders the film(S) more readily crushable is added to the matrix polystyrene of the present invention.

Resin component II

In those cases where the surface layer (S) is treated only with a swelling agent in the later described swelling treatment, to increase crushability it is necessary to add a small amount of resin component (II) to the surface layer (S). Resin component (II) is softer than the polymer of styrene in the surface layer (S) and has a lower softening point.

Resins which can be used as the resin component (II) satisfy the following formula:

$T_o - T > 3$ seconds:

wherein $T_o$ = time in seconds for a surface layer treated in n-heptane at 45°C to reach a whiteness value (L value) of 83 ± 2%;

and T = time in seconds for the same surface layer but containing 5% of resin component (II), based on surface layer weight, treated in n-heptane at 45°C to reach a whiteness value (L value) of 83 ± 2%;

the surface layer consisting of 94% by weight polymer of styrene component and 6% by weight of polybutadiene component containing fine particles of a size of 0.1 – 10μ (more than 80% by number, of an average diameter of 3 – 4μ) uniformly dispersed therein;

and have a melt index of 2.2g/10min., 18 – 19 wt. % of insolubles in toluene, and the polymer of styrene component having an $[\eta]$ toluene[30] of 0.8;

the surface layer being laminated to a substrate of the same composition but containing 1% Phthalocyanine Blue;

the laminate being simultaneously biaxially stretched at 128°C 4X in the longitudinal and width directions, where surface layer and substrate thicknesses after stretching are 12 μ and 23 μ, respectively.

The matrix polystyrene containing fine particles was prepared in the same manner as in Example 1 of Japanese Patent Publication No. 3291/1957.

Preferred materials used as resin component (II) have a Shore hardness less than 90° (JIS K 6301) and a Vicat softening point of less than 60°C (ASTM D-785).

Illustrative of resins which meet the above criteria are polyalkylene oxides such as polyethylene oxide, olefinic copolymers such as copolymers of olefins and polar vinyl monomers, for instance, copolymers with acrylic acids such as acrylic acid, methacrylic acid and the like, copolymers with acrylic acid esters, for example, methylacrylates, ethylacrylates and the like and copolymers with vinyl esters, for example, vinyl acetate, glycidal methacrylate and the like, the polar vinyl monomer preferably being from about 12 to about 40% by weight based on the olefinic copolymer in the above case, and materials such as polyisobutylene or petroleum resins.

Resin component (II) is used in an amount less than about 15% by weight based on the weight of resin component (I), most preferably 1 to 10% by weight.

An especially preferred class of materials comprises:

i. ethylene-vinyl acetate copolymers, e.g., the ethylene-vinyl acetate copolymer is preferably a copolymer of about 2 to about 60g/10 min. in melt flow rate measured by ASTM-D-1238(revised) containing from 10 to 50% by weight, preferably 20 to 40% by weight, vinyl acetate. The content of the copolymer based on the above-described resin component (I) is less than 15% by weight, preferably 1 to 10% by weight.

ii. polyethylene oxides, e.g., a polyethylene oxide of a molecular weight of from about 3,000 to 200,000, preferably, 4,000 to 100,000, which can have a small amount of propylene oxide copolymerized therewith. The amount of polyethylene oxide based on the above-described resin component (I) is generally less than 1.5% by weight, preferably 0.5 to 1.0% by weight.

iii. polyisobutylenes, e.g., preferably of a molecular weight of from about 300 to 600, more preferably 450 to 550, which can be copolymerized with a small proportion of isoprene. The amount of the polyisobutylene to resin component (I) is generally less than 1.5% by weight, preferably 0.5 to 1.0% by weight.

iv. a petroleum resin, e.g., one prepared by converting $C_9$ to $C_{11}$ aromatic olefins and/or diolefins into alicyclics by hydrogenation. It is preferable that the softening point of the petroleum resin be from about 80° to 125°C, in particular 85° to 90°C. The amount of the petroleum resin to the resin component (I) is generally less than 1.5% by weight, preferably 0.5 to 1.0% by weight.

Mixtures of various matrix styrenes, more than one rubbery particle material and more than one resin component II material can also be used, but little is usually gained with such complicated systems.

Resin component (II) is different from the styrene polymer and the microgel particles

Resin mixture

The mixing of the resin (I) [matrix styrene and fine rubbery particles] and resin component (II) can be conducted in any manner capable of uniformly blending both components. Practically, both components can be kneaded at a temperature higher than the softening points thereof or they can be mixed as solutions or dispersions thereof. In the present invention, in one embodiment the object of this invention of improved crushability is obtained by using a resin mixture of the resin component (I) and resin component (II). Resin component (II) also promotes the diffusion of the swelling agent.

The film (S) per se desirably substantially colorless because it is employed for providing a paper-like appearance to the product sheet but, depending upon the use, the film can be colored to permit easy reading of marks, patterns, figures etc. For example, if the substrate film (B) is colored blue, the film (S) can be colored red, yellow, pink, gray, etc.

2. Colored resin film (B):

Colored resin film (B) is the substrate for the film (S) (paper-like layer). It is a colored layer and serves as a base or backing material for the laminate sheet product of this invention. The film is not always composed of a single layer and can have, if desired, a laminated film structure.

Resin

As the material used to form the colored resin film (B), any desired resinous material which is capable of forming a film can be used. It is preferred that the resin for the film (B) is stretchable and is provided with a sufficient strength by stretching because the resin film (B) serves, as described above, as the base material or the backing material for the laminated sheet product of this invention and also from the standpoint of the actual production of the final product as described hereinafter in detail. Also, it is desirable that the melt flow rate of the resin as measured by ASTM-D-1238 is from about 0.1 to about 10.

Typical examples of resin used to form the substrate film include a styrene polymer resin such as a homopolymer of styrene or a nucleus and/or side chain-substituted styrene (e.g., vinyltoluene, chlorostyrene, and α-methylstyrene) and copolymers or interpolymers thereof with another copolymerizable monomer or monomers; a vinyl or vinylidene polymer resin such as a homopolymer of vinyl acetate, vinyl chloride, vinylidene chloride, etc., or an interpolymer or copolymer thereof with other copolymerizable monomer or monomers; and the like. These resins can be used alone or as a mixture thereof, or as a mixture with other resins or polymers.

Other examples of the resin used for film (B) which can be used in this invention include the same material as the styrene polymer of the aforesaid film (S) or as the matrix styrene polymer or other styrene polymers different from the above styrene polymer. For example, a general purpose styrene homopolymer (GP/PS) of about 0.1 to about 5 in melt flow rate as measured by ASTM-D-1238 and a mixture of such a styrene homopolymer with other resins such as an impact resistant styrene polymer, polyolefins and the like can be used. The resin for the film (B) can also contain a filler or other desired additives, e.g., anti-oxidizing agents, anti-static agents and flowability improving agents can be added in various amounts depending upon the use of the final product.

Coloring agent

Suitable agents for coloring the substrate film (B) which can be used in the present invention include inorganic pigments such as iron black, ceramic black, Chrome Green, chromium oxide, ultramarine, Berlin Blue, Cobalt Blue, sienna, iron oxide, Titan Yellow, Chrome Yellow, Chrome Orange, and cadmium sulfide; organic pigments such as bone black, carbon black, Indanthrane Green, toners, Phthalocyanine Blue, Phthalocyanine Green, Azonickel Green, Hansa Yellow, naphthol, and toluidine; organic dyes such as acid chromic dyes, acetate dyes, anthraquinone dyes, and azo dyes; and combinations of such coloring agents.

In general, any coloring agent having good dispersibility in or compatibility with the resin used to form substrate film (B) can be used. The coloring agent somewhat affects the contrast of the marks in the pressure sensitive recording sheets and may be used in an appropriate amount for obtaining any desired mark contrast.

The coloring agent can be incorporated into the resin by any well-known procedure. For example, by directly kneading it in the resin, by adding it to a solution of the resin in a solvent followed by casting and drying, by directly kneading the coloring agent in the resin, by adding it to a solution of the resin in a solvent followed by casting and drying, by kneading a colored master batch into an uncolored synthetic resin or by coloring the resin during the formation of the microporous opaque surface layer. Furthermore, an uncolored resin film can be laminated onto a colored film to provide an entirely colored film. In this case, the uncolored film can be laminated on one or both surfaces of the colored film.

The color difference between the surface layer of the present invention and the film (B) is preferably 3.0 or more based on the NBS criteria (National Bureau of Standards), and the color of the surface layer is preferably lighter than that of the film (B).

The color used will vary depending upon the kind of coloring agent, and the apparent color density varies depending upon the thickness of the colored film (B). Accordingly, the amount of the coloring agent added will usually be individually determined depending upon the coloring agents used and the range of the mark deciphering capability required.

For example, when Phthalocyanine Blue is used as the coloring agent and the thickness of the layer colored is 30 microns the amount of the coloring agent added is 0.3 to 1 wt. % based on the resin of film (B). On the other hand, when carbon black is used as the coloring agent, the amount added is 0.2 – 0.8 wt. %.

3. Preparation of the stretched laminate film:

The lamination of film (S) on the surface layer of the colored substrate (B) can be conducted by preparing both films separately and then adhering them using adhesives, e.g., hot melt adhesives such as ethylene-vinyl acetate having a softening point of 60°C – 80°C, by a heat sealing method or by other conventional means, but the laminate is most preferably prepared by melt-extruding resin component (I) or a resin mixture of resin component (I) and resin component (II) onto the one or both surfaces of the colored film (B) to provide a laminate, and then stretching the laminate thus prepared. As heretofore indicated, the purpose of this stretching step is primarily to deform the fine particles of rubbery polymer which are dispersed in the matrix styrene of film (S). In the case of biaxially stretching, the laminate can be first stretched in the longitudinal direction and then stretched in the width direction, or vice versa, or can be simultaneously biaxially stretched at the same time. If desired, the laminate can be stretched uniaxially.

Stretching

In considering the stretching of the present invention the relationship between the substrate (B) and surface layer (S) must be considered, i.e., the primary function of substrate (B) is to provide physical strength to the assembly while the primary function of the surface layer (S) is to provide what may be called paper writing properties to the assembly.

Considering these two functions, it will be appreciated that the main function of the stretching is to deform the fine particles in the surface layer (S). For this reason, it can be said that only the surface layer (S) need be at least uniaxially stretched. However, it is preferred in many cases to stretch both layers, and in this case different stretching degrees may be used, though obviously it is much simpler to stretch both in one step by selecting a stretch which optimizes both layers.

In this regard, the substrate (B) is subjected to a balanced stretch, i.e., the stretch in one direction is not inordinately greater than the stretch in the other direction. For commercial operation, this is about 1:1 to about 1:4, that is, the stretch in one direction will not be more than four times the stretch in the other direction.

On the other hand, as hereafter explained, the surface layer (S) is subjected to a stretch ratio of 6 – 40, which can be correllated with the balanced stretch of the substrate (B), if such is performed. For instance, a stretch ratio of 16 as in Example 1 is also a balanced stretch (4×:4× = 1:1) for the substrate (B).

While it is mandatory to stretch the writing surface layer (S) to a stretch ratio of 6 – 40, if a surface layer is formed on the back of the substrate (B), stretching is optional. Of course, if one wished to form the microvoids stretching would be required. For the resin (optional) filler layer later described, while stretching is theoretically possible, in commercial operation this layer can be cracked easily so usually it will be coated after any stretching and, generally speaking, after contact with the swelling agent.

Since the colored substrate film (B) can usually be improved by stretching and the surface layer film (S) must be stretched, a laminate prepared in the above-described manner is advisably stretched under conditions such that a balanced stretching is effectively applied to the both films.

The important factors of the stretching conditions in the present invention are the stretching temperature, the stretching magnification for the substrate (B) in the longitudinal and the width directions and the stretching ratio for the surface layer (S).

With respect to film (S), to effectively form a microvoid layer mainly during treating with the swelling composition is, of course, a necessary condition and the stretching temperature and stretching ratio are the main factors in this case.

With respect to film (B), to control the physical properties of the products, e.g., tearing strength, tensile strength, stretching property etc., the stretching temperature and stretching magnification are the main factors.

The optimum conditions for stretching the colored film (B) and the surface layer film (S) are determined in accordance with the aforesaid factors as amplified upon below.

The stretching temperature is higher than the secondary transition points of the resin or resin stretched and further is in the range of stretching temperatures as are commonly used (temperatures lower than the flow temperature). For example, the stretching temperatures ranges from about 105° to about 130°C when the surface layer film (S) comprises polystyrene having uniformly dispersed therein fine particles of polybutadiene.

The rate of stretching should be determined so that the fine particles of the rubbery polymer can be provided with sufficient strain and the proper stretching ratio can range from about 6 to about 40, preferably about from 10 to 20.

The "stretching ratio" which by definition can never be less than 1, is defined as follows;

Stretching Ratio = (Stretching Value in Longitudinal Direction) × (Stretching Value in Width Direction).

The term "stretching value" as used above is defined to be the shrinking value of the stretched film before and after the immersion of the film in a glycerin bath at 115°C for 5 seconds.

$$\text{Stretching Value} = \frac{\text{(Length of film in One Direction befre Immersion)}}{\text{(Length Thereof in Same Direction after Immersion)}}$$

Property of the stretched laminate sheet

The laminate film prepared in the aforesaid preferred manner is composed of the biaxially stretched colored film (B) and the biaxially stretched film (S) consisting of resin component (I) or a resin mixture of resin component (I) and resin component (II) strongly adhered to at least one surface of the colored film (B).

The thickness of the films thus laminated depends on the thickness of each original film, the extent of stretching, etc., but the thickness of the laminate film after stretching is generally from about 25 to about 300 microns, preferably from about 35 to about 170 microns. The surface layer (S) for masking the color of the colored substrate layer (B) generally has a thickness greater than about 5 microns, preferably from about 9 to about 20 microns.

When the surface layer (S) is formed on one surface of the colored substrate film (B), another resin film, for example, a resin film which will not be rendered opaque by the swelling treatment as described hereinafter, can be laminated on the opposite surface of the film (B).

2. Swelling treatment:

The laminate film prepared in the above-described manner is treated with a swelling composition to make the surface layer opaque and provide a paper-like property thereto, i.e., to make the surface layer opaque and white and provide properties thereto at least equal to those of a natural sheet of paper e.g., markability, printability etc.

The "swelling composition" contains a swelling agent which swells and softens at least the surface of the polymer of styrene and thereby permits the deformed fine particles to return to their original shape whereby the microvoids are formed.

When resin component (I) and (II) are used together, the swelling composition can comprise only a swelling agent. However, when resin component (II) is not present, improved crushability can be obtained by including a liquid component (II) in the swelling composition along with the swelling agent (the swelling agent is often referred to as liquid component (I)).

(I) Liquid component (I) swelling agent

Liquid component (I) is capable of swelling the styrene polymer of the surface layer (S) at a given treating temperature but dissolves the surface layer (S) in an amount less than 0.5 g/m² when contacted therewith for 60 seconds at 45°C, i.e., liquid component (I) (swelling agent) is selected from so-called non-solvents for styrene polymers, that is, the styrene polymer is substantially insoluble in liquid component (I) at temperatures lower than about 35°C., in particular at normal room temperature.

Liquid component (I) capable of swelling the styrene polymer at temperatures higher than about 35°C includes various types of organic solvents and thus the swelling agents used in this invention are not limited to any specific solvent. However, typical examples of the swelling agent are aliphatic hydrocarbons having from about 5 to about 8 carbon atoms, such as pentane, hexane, heptane, octane, and mixtures thereof. Additional swelling agents useful in the present invention are disclosed in copending U.S. application Ser. No. 93,714, now U.S. Pat. No. 3,741,860, filed on Nov. 30, 1970 in the names of Shiro Otsubo et al and entitled 'PRODUCT OF PAPERY FILM".

The selection of any particular swelling agent is not overly important so long as it meets the general criterion set forth.

The temperature dependency of the swelling agent used in this invention can be controlled by the use of solvents which are capable of dissolving the styrene polymer. For example, an aromatic hydrocarbon such as benzene, toluene, tetralin, etc., an aliphatic hydrocarbon such as cyclohexane, methylcyclohexane, decalin, etc.; a ketone such as acetone, methyl ethyl ketone, cyclohexanone, etc.; an ether such as diethylether, dioxane, etc.; a halogenated hydrocarbon such as chlorobenzene, carbon tetrachloride, etc.; and the like can be added to liquid component (I) [e.g, the aforesaid aliphatic hydrocarbon or hydrocarbons] individually or as a mixture thereof. The proportion of these solvents in a mixture of the swelling agent and the solvents is, for example, less than 10% by weight, preferably less than 5% by weight, of the swelling agent.

(2) Liquid component (II)-agent which renders the film (S) more readily rupturable or crushable upon the application of pressure.

In those instances where resin component (II) is not present, liquid component (II) is added to the swelling agent to provide improved crushability similar to that provided by resin component (II).

Liquid component (II) is different from the swelling agent and is soluble in the swelling agent at least at the film treating temperature. From about 0.5 to about 50% by weight of liquid component (II) based on the weight of swelling agent is used.

Liquid component (II) per se does not dissolve the surface layer (S) at 40°C, and when 2 – 10% by weight, based on the n-heptane weight, is mixed with n-heptane forms a paper-like material satisfying the following formula:

$$T_o - T > 3 \text{ seconds}$$

where $T_o$ = time in seconds for a surface layer treated in n-heptane to reach a whiteness value (L value) of 83 ± 2% and $T$ = time in seconds for the same surface layer treated in n-heptane with 2 – 10% of liquid component (II) to reach a surface whiteness (L value) of 83 ± 2%;

the surface layer consisting of 94% by weight polymer of styrene component and 6% by weight of polybutadiene component, containing fine particles of a size of 0.1 – 10 $\mu$ (more than 80% by number of an average diameter of 3 – 4 $\mu$) uniformly dispersed therein, and having a melt index of 2.2g/10 min., 18 to 19 wt. % of insolubles in toluene, and the polymer of styrene component, having an $[\eta]$ toluene$^{30}$ of 0.8;

the surface layer being laminated to a substrate of the same composition but containing 1% phthalocyanine Blue;

the laminate being simultaneously biaxially stretched at 128°C 4× in the longitudinal and width directions, where surface layer and substrate thicknesses after stretching are 12$\mu$ and 23 $\mu$, respectively.

The matrix polystyrene containing polybutadiene fine particles was prepared in the same manner as in Example 1 of Japanese Patent Publication No. 3291/1957.

Liquid component (II) is typically an organic compound, and preferred materials satisfying the above formula are exemplified below, but it will apparent to one skilled in the art that other materials which can be used as liquid component (II) can easily be tested for suitability following the above procedure.

a. R—OH (alcohol):

wherein R represents a saturated or unsaturated aliphatic hydrocarbon group having 2 to 18 carbon atoms, preferably 8 to 18 carbon atoms. Typical examples of such alcohols include ethanol, propanols, butanols, hexanols, octanols, stearyl alcohol, cetyl alcohol, decyl alcohol, 2-ethylhexyl alcohol, myristyl alcohol, and the like.

b. R—O—(—R°O—)$_n$H (ether alcohols):

wherein R represents an aliphatic hydrocarbon group having 8 to 18 carbon atoms, preferably 10 to 16 carbon atoms; R° represents a divalent aliphatic hydrocarbon group having 2 to 3 carbon atoms; and $n$ is an integer of 1 to 7. Typical examples of such ether alcohols are 2-oxyethylene cetyl alcohol ether, 2-oxyethylene layryl alcohol ether, and the like.

c. R'—CO—OH (fatty acid):

wherein R' represents a hydrocarbon group having 1 to 17 carbon atoms. Typical examples of such fatty acids are lauric acid, capric acid and the like.

d. R'—CO—O—R'' (esters):

wherein R' represents an aliphatic hydrocarbon group having 7 to 17 carbon atoms and R'' represents an aliphatic hydrocarbon group having 1 to 18 carbon atoms. Typical examples of such esters are 2-oxyethylene stearate, isopropyl myristate, butyl laurate and the like.

e. R'—O—OC—R°°—CO—R'' (esters):

wherein R' and R'' represent an aliphatic hydrocarbon group having 2 to 18 carbon atoms and R°° represents a divalent hydrocarbon group having 6 to 16 carbon atoms.

Typical examples of such esters are diethyl sebacate and the like.

While the term "liquid component (II)" is used, this term includes solids so long as they are dissolved in the swelling agent at the treating temperature. Thus, at the time of treatment, all components are in liquid form and are present in an effective amount. While it will be clear to one skilled in the art complete solubility in the swelling agent is not required, little is to be gained by selecting a material which is not soluble in the swelling agent considering this will lead to the necessity for extra cleaning of process equipment, pontential higher material costs and, most importantly, completely soluble liquid component (II) materials are easily available.

3. Treatment procedure:

The treatment by the swelling composition, be it comprised of liquid component (I) alone or with liquid component (II), with or without the use of a solvent capable of dissolving the polystyrene, is conducted by contacting at least the writing surface layer of the above-described stretched laminate film with the swelling composition at temperatures providing a swelling action on the styrene polymer of the surface layer (S), for example, at temperatures higher than about 35°C, preferably higher than 40°C. The upper limit of the treating temperatures is that temperature at which the laminate film treated is deformed to such a great degree it cannot be used as a synthetic paper or the boiling temperature of the surface treating agent.

The treating period of time is a time sufficient for converting film (S) to a paper-like opaque microporous layer at the treating temperature, usually at least 0.1 second to a few hundred seconds.

The treating time varies depending upon such factors as the treating temperature, the treating solvents, the material of the film (S), the stretching temperature, the stretching magnification, etc. Accordingly, the determination of the optimum treating time is usually experimentally determined in order that the treated surface meets all necessary factors, e.g., the apparent whiteness of the product film layer, the degree of coloring upon marking marks, printability, etc.

As a general rule, in determining the treating time the film (S) can be considered fixed, and usually one will also have optimized the stretching conditions and have selected the swelling composition to be used, the latter selection being highly influenced by swelling composition cost.

Usually a temperature is set and the time of treating varied until acceptable results are obtained. Conversely, time can be set constant and temperature varied. Generally speaking, increasing temperature and/or time increases the effect of the swelling treatment, and with this guideline in mind the treating time is easily empirically determined.

Considering all of the above factors, the original thickness of the film (S) treated with solvent is usually about 2 to about 20$\mu$, preferably, 4 to 15 $\mu$. The degree of microvoid formation is usually determined by measuring the apparent whiteness. The L value (described by "Hunter") is usually about 60% to about 98%, preferably 65% to 85%. Within these range process variables are most easily balanced to provide best results.

For example, when the aliphatic hydrocarbons are used as the swelling agent, the treating time is 1 to 180 seconds at 60° to 40°C.

The stretched laminate film can be brought into contact with the swelling composition at a definite temperature e.g., 35°C, in any desired manner to secure the contact of the stretched laminate film with the swelling composition. For example, in one typical procedure the laminate film is passed through a swelling composition bath which is maintained at the desired temperature. It is also possible to maintain the bath at temperatures lower than the definite temperature while the laminate film passed through the bath is heated to the definite temperature while the surface of the laminate film is still wetted with the swelling composition.

The swelling treatment can be also conducted by other methods such as coating, spraying, etc.

When the back layer of the final product is not desired to be converted into a microporous opaque layer, the back surface can be covered by a film impermeable to the swelling composition if the back surface is sensitive to the swelling treatment.

The treatment with the swelling composition can be repeatedly conducted under the same conditions or different conditions.

4. Discontinuation of the swelling action:

It is preferable in this invention that the swelling action by the swelling composition be discontinued after the desired degree of swelling by lowering the treating temperature.

The cooling of the laminate film after the swelling treatment can be conducted in any desired manner. For example, after removing, if necessary, any excess of swelling composition attached to the laminate film by means of a squeeze roll, a felt roll, an air knife or the like, the laminate film is introduced into a cooling zone which is maintained at a temperature which prevents the progress of the swelling action by the swelling agent, e.g., at temperatures lower than 35°C. Cooling can generally be accomplished by allowing the laminate film to contact cold air.

After cooling, the swelling agent attached to the laminate is completely removed by means of drying, a squeeze roll or an air knife, preferably at the same temperature as above. As earlier described, one preferred agent for increasing crushability is a higher fatty acid or a derivative thereof. When such a compound is of a high boiling point, the compound sometimes remains on the surface of the opaque microporous layer after the swelling agent is removed by drying. If the presence of such a compound on the surface is undesirable, it and the swelling agent attached to the opaque layer can be removed by means of a squeeze roll, an air knife or like means. In addition, if such an agent for increasing crushability remains unevenly on the surface of the opaque paper-like layer, the whiteness of the paper-like sheet becomes uneven and thus it is necessary to conduct the removal of the swelling agent uniformly over the whole surface of the paper-like layer if such uneven whiteness is undesirable.

5. Properties of the formed paper-like layer:

The surface paper-like layer thus formed has uniformly distributed fine voids and thus has an opaque, paper-like appearrance mainly due to the irregular reflection of the voids. The voids disposed near the surface of the paper-like layer are open to the surrounding atmosphere.

The uneven structure of the surface may also be obtained by a conventional solvent treatment if resin component (II) is present, for example, treating firstly with suitable solvents for polystyrene such as aromatic hydrocarbons (e.g., benzene, toluene etc.) or ketones (e.g., acetone, methylethylketone etc.) and then treating with non-solvents for the polystyrene such as alcohols (as disclosed in British Pat. No. 1,175,046) or the like, but when resin component (I) and the swelling composition containing liquid component II are used according to the present invention, the surface microporous structure thus formed is readily crushed or ruptured by the application of local marking pressure to reveal the color of the colored substrate layer. When the resin mixture of the resin component (I) and the resin component (II) are employed with liquid component (II), rupturability or crushability can be further improved, and this is a most preferred embodiment.

3. Final product:

The opaque laminate film thus obtained per se has a pressure-sensitive recording ability or self-marking property and thus can be used for marking letters, etc., by means of a typewriter and the like without using carbon papers, ink ribbons, carbon ribbons, etc. In using the pressure-sensitive recording sheet prepared by the process of this invention as a recording paper for recording devices, records can be marked by scanning a sharp stylus loaded with a proper weight along the surface of the recording paper in place of using conventional pen and ink.

The pressure-sensitive recording sheets prepared using resin component (II) and/or liquid component (II) which provide easier crushability according to the process of this invention are characterized in that the opaque surface layer thereof is readily ruptured or crushed by local marking pressure. By utilizing the above characteristic, many duplications can be obtained at the same time by applying marking pressure onto a pile of the laminate films. This characteristic makes it possible to obtain clear, sharp duplications upon applying marking pressure using, e.g., a typewriter, pencil, ball point pen, etc. Further, because the product of this invention has a self-marking or autogenous pressure-sensitive recording property, any paper can be used as the uppermost paper of the pressure-sensitive recording system.

If desired, the pressure-sensitive recording sheets prepared by the process of this invention can be subjected to a secondary processing such as a filler coating on the back surface thereof, or more preferably a resin-optional filler coating as later described in detail.

The advantages of the pressure-sensitive recording sheet prepared by the process of this invention are as follows:

The product of this invention is of the type that the surface of a colored resin film is masked by a microporous opaque layer and the color of the substrate is locally revealed upon rupturing or crushing the opaque layer by applying thereto a marking pressure so as to make local portions of the microporous opaque layer of the film (S) transparent. A product of this type is called a self-marking or autogenous pressure-sensitive recording sheet.

In the product of this invention, the colored substrate and the microporous opaque layer are composed of different films and, therefore, the requirements necessary for each layer can be satisfied independently. Further, since the microporous opaque layer is strongly attached to the surface of the colored substrate, no problems are encountered due to stripping of the opaque layer. Moreover, because the colored substrate film and the microporous opaque layer are composed of synthetic resin relatively uninfluenced by changes in humidity, the pressure-sensitive recording sheet of this invention is not deformed by humidity and further duplicated marks are stable to humidity and light and can be stored for a long period of time without being discolored.

A primary feature of the present invention resides in the point that the surface microporous opaque layer of the pressure-sensitive recording sheet prepared by the process of this invention is composed of a resin component (I) alone or in combination with a resin component (II), and/or that a liquid component (II) is further incorporated in a swelling agent for treating the styrene polymer film layer. That is, when the agent providing improved ease of crushability (liquid component II) to the styrene polymer film is present in the swelling agent for the styrene polymer film, the microporous opaque layer formed shows lowered compression restoration and thus becomes readily transparent by local marking pressure to clearly reveal the color of the substrate as compared with the use of the swelling agent alone or the use of a swelling composition containing additives other than liquid component (II).

One additional feature of one embodiment of this invention lies in the point that the surface layer composed of the microporous opaque layer is made of a resin mixture in which resin component (II) is incorporated in a small proportion in addition to the resin component (I). Resin component (II) is a resin providing improved ease of crushability to the opaque layer formed on the surface of the film (S) by the swelling treatment, and when a microporous opaque layer is formed by treating the film (S) of resin component (I) blended with resin component (II) with a swelling agent for the styrene polymer, the layer becomes really crushable or rupturable by the application of local marking pressure to reveal the color of the substrate.

Accordingly, the product of this invention is suitable for obtaining duplications of letters having sharp contrast. In addition, by incorporating the resin component (II), the penetration of the swelling agent is promoted in the case of treating the laminate film with the swelling agent.

As described above, the effect of this invention becomes more remarkable when liquid component (II) is incorporated in the swelling agent for the swelling treatment, that is, when liquid component (II) is present in the swelling composition the microporous opaque layer formed is far more easily ruptured as compared to the case where the swelling agent is present alone and thus the microporous opaque layer formed by the present invention is quite readily ruptured by marking pressure, etc., and a sharp substrate color appears.

Liquid component II exhibits its effect only when it is used for the surface treatment together with the swelling agent. Thus, the effect of this invention, in particular the effect of providing easy rupturing to the opaque layer upon applying marking pressure to reveal the color of the colored substrate, cannot be obtained even if liquid component II is kneaded into the surface layer prior to the swelling treatment or even if it is applied to the opaque layer after treatment with the swelling agent.

The microporous opaque layer formed by the process of this invention provides a good paper-like appearance and a paper-like property to the pressure-sensitive recording sheet of this invention, and thus the product of this invention is excellent in printability and writing or marking ability.

The present invention includes a number of embodiments. The preferred embodiments may be described using the following abbreviations: B = substrate; $S_m$ = surface layer with microvoids; $S_B$ = surface layer without microvoid; RF = resin (optional) filler layer as will fully be described hereafter (writing layer given first):

1. $S_m/B$
2. $S_m/B/S_B$
3. $S_m/B/RF$
4. $S_m/B/S_B/RF$
5. $S_m/B/S_m/RF$
6. $S_m/B/S_m$

In certain embodiments, the substrate film (B) has only one surface thereof coated with a surface layer composition (see 1 and 3 above). In this case, in certain instances a curling effect will appear when the surface layer is treated with the swelling composition.

On the other hand, if both surfaces of the substrate film (B) are coated with a surface layer (see 6 above), this leads to a further disadvantage, that is, where a substrate film (B) is coated on both sides with a surface layer ($S_m$), the back or rear layer ($S_m$ in the above) tends to absorb writing force applied to the pressure sensitive paper, and accordingly in cases where one wishes to provide clean copies from 5 to 7 or more papers in pile form, difficulty is encountered in obtaining clean copies with the bottom sheets due to the absorption of the writing pressure by the back or rear surface layers of the upper sheets.

To solve the above problem, in instances where a plurality of copies are to be made, it is advisable to coat the back or rear layer ($S_m$), though other embodiments can be so coated, with a coating of a hard resin which may optionally contain a filler (RF in the above). The coating of the hard resin optionally containing a filler tends to reduce the absorption of writing pressure by the back or rear layer and permits a plurality of clean copies to be made. The substrate film (B) can, of course, be so coated.

In case 5 above it is preferred that the layer on the back or rear side not be treated with a swelling composition (i.e., to obtain the back "non-writing" layer $S_m$ only a swelling agent per se be used — thus, the back $S_m$ layer in this embodiment, while it is swollen and does contain a void structure, is not produced (using liquid component II), and not contain resin component (II), and that the layer on the back or rear side be thin, that is, the thickness ratio of the layers identified as $S_m$ in case 5 above (thickness of the writing face/thickness of the back or rear side) preferably be in the range of about 1:1 to about 2:1.

The main criterion of a resin-(optional) filler coating is that the resin has a coated film hardness (JIS K-5400) of from about 10 to about 30, preferably 15 to 25. If this criterion is met, these are no special limits on the resin-(optional) filler coating.

Such a layer consists essentially of resin and an optional filler. Based on the total amount of resin and filler, 100 (0 percent filler) to 15 weight %, preferably about 30 to about 20 weight %, of resin is used. Generally from 50 to 90 wt %, preferably about 70 to about 80 weight % of filler is used.

Representative of the resins which can be used are adhesive and thermosetting resins which harden at a bout 50° to about 80°C. For example, suitable adhesives are nitrile copolymers of olefinic unsaturated acids such as acrylic acid, methacrylic acid, chloroacrylic acid and the like, specific copolymers, including methyl methacrylic acid - acrylonitrile copolymers, methyl methacrylic acid - methacrylonitrile copolymers and acrylic acid ester copolymers such as methyl methacrylic acid - ethyl acrylate copolymers, methyl methacrylic acid - butyl acrylate copolymers and the like.

Specific examples of thermosetting resins preferably used are urea-formaldehyde condensate resins, melamine-formaldehyde condensate resins and the like.

Examples of useful fillers include inorganic fillers such as titanium dioxide, clay, calcium carbonate and the like, and organic fillers such as bone meal and the like. The filler will preferably have a mean particle size of about 0.3 to about 0.7 microns.

The filler serves, to a certain extent, to influence the color tone of the reverse side and to increase absorption of ink.

The layer of resin with optional filler is usually applied at a rate of about 2 to about 6 g/m$^2$, uniform application being used.

The resin with optional filler layer can be applied in a mixed aqueous solution of resin and filler with easy application being obtained if the viscosity is about 40 to about 400 cps, preferably 50 – 100 cps. Aqueous polymers, e.g., polysodium acrylic acid, polyethylene oxide, casein, and the like can be used, if desired.

If desired, the coating solution can also contain surface active agents, dispersing agents, antistatic agents and the like.

Some of the various embodiments of the invention will be clear upon reference to FIGS. 15 – 17 discussed in detail below.

Figure 15:
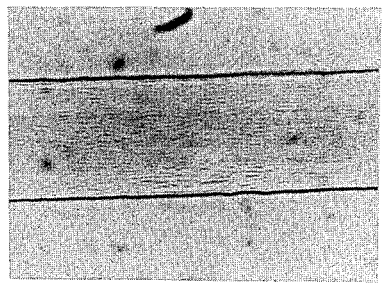
FIGS. 15 to 17 are cross sectional views of recording sheets in accordance with the present invention.

Referring firstly to FIG. 15, this figure shows a three layer laminate film which has not yet been treated with a swelling agent. From the top, the first surface layer (S) is 13 microns thick, the middle or substrate layer (B), which is colored, is 23 microns thick and the back layer is 14 microns thick. The substrate (middle layer) is darker because it is colored.

Figure 16:
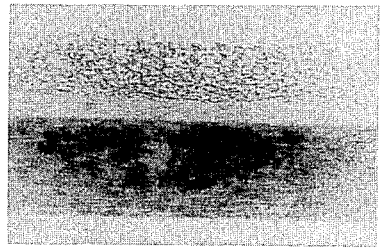

Referring now to FIG. 16, this figure shows a three layer laminate film where only the upper surface layer has been treated with a swelling agent to provide a surface microvoid layer 11 microns thick having a surface whiteness (L value) of 81.5%. It actually appears that four layers occur in the sample of FIG. 16, but the top "two" layers above the dark layer (colored middle layer) actually comprise the surface layer where the micorvoids are only in the upper portion of the surface layer. The substrate and back or lowermost layer are clearly seen.

Figure 17:
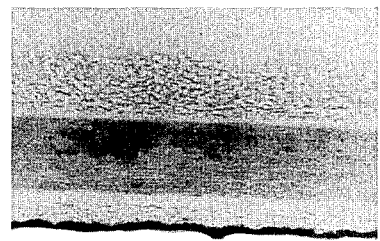

FIG. 17 shows a three layer laminate where both the upper surface layer and the back or bottom surface layer have been treated with a swelling agent to provide a microvoid layer. However, in this embodiment the back layer is further surface coated with a resin-filler coating which in FIG. 17 is seen as the extremely dark lowermost coating. The upper surface layer had a whiteness (L value) of 86.2 % and the microvoid layer was 21 microns thick. The back surface microvoid layer was 5 microns thick and the resin-filler coated layer (RF) was 2 microns thick. Six areas of demarcation are easily seen in FIG. 17.

The invention will now be further illustrated by several examples, in which all percentages and all parts as regards compositions are by weight, unless otherwise indicated. These examples are not, of course, to be construed as limiting the scope of this invention.

Example 1 (and Comparative Example)

A laminate film composed of a surface layer (S), a substrate (B), and a backing layer (S') [a styrene polymer containing the aforesaid rubbery polymer particles was extruded on both sides of the colored film (B)]was biaxially stretched at 128°C. so that the length in both the longitudial direction and the width direction became four times that of the original sheet (stretching ratio of 16). The thickness of the surface layer (S) was 12 microns. The surface layer consisted of a styrene/butadiene graft system produced in accordance with Example 1 of Japanese Patent 22,077/1965 (bulk/suspension polymerization) and contained 94% styrene and 6% polybutadiene. The fine particles of rubbery polymer produced by the bulk-suspension polymerization had a diameter of 0.1 to 10 microns. The surface layer had a melt flow rate of 2.2g/10min., an 18 - 19 wt. % insolubles content in toluene and the polymer of styrene matrix component an $[\eta]$ toluene$^{30}$=0.8. The substrate layer (B) was the same as the surface layer but contained 1% Phthalocyanine Blue and the thikcness thereof was 23 microns. The backing layer (S') was the same composition as the surface layer and the thickness thereof was 10 microns.

In order to prevent curling of the treated film both the surface and backing layers of the film were treated until the whiteness thereof was 74 – 75% (L value).

The surface and back sides of the stretched laminate film were immersed in n-heptane for 29 seconds at 45°C and then dried in air to remove the heptane from the surface of the film. Then, in order to render the microvoid layer easily crushable and to obtain a clear copy, on the (S)-side of the film a swelling composition was applied so as to provide a 82 to 85% whiteness, i.e., the surface layer side (S) of the laminate film thus treated in the n-heptane was further immersed in a swelling composition consisting of 95.8% n-heptane and 4.2% of liquid component II as shown in Table 1 at 45°C.

In this case, the back surface (S') was covered by a polypropylene film which was insoluble in the swelling composition to prevent the back layer from being brought into contact with the swelling composition. After the solvent treatment was over, the laminate film was withdrawn from the bath and the excess swelling composition attached to the surface thereof was squeezed off by a squeeze roll at a pressure of 1.5 Kg/cm. Thereafter, the laminate film was dried in air at 25°C to remove n-heptane and after separating the insoluble cover film from the back surface, the same treatment as above was applied to the back layer with only n-heptane for the sake of a comparative example. The results obtained are shown in Table 1.

The terms used in the table are as follows:

Whiteness: Determined by the brightness L-value, which was measured by means of an automatic color-difference meter (made by the Tokyo Rika K. K.).

Duplication property:
a. Ball pen writing: A straight line was marked using a ball pen under a load of 500 g. and the number of sheets duplicated counted.
b. Typewriting: An electric typewriter was set for eight sheet duplications and the number of sheets duplicated counted.

Table 1

| Experiment No. | Agent providing inrreased ease of rupturability (Liquid Compenent II) | Treating time in swelling composition (sec) | Whiteness (surface S) (%) | Whiteness (surface S')(%) | Duplication property Ball pen writing | Typewriting | Printability |
|---|---|---|---|---|---|---|---|
| 1 | cetyl alcohol | 13 | 83.0 | 73.8 | 5 | 6 | good |
| 2 | mirystyl alcohol | 13 | 83.6 | 74.4 | 7 | 8 | good |
| 3 | lauryl alcohol | 8 | 83.8 | 75.5 | 7 | 8 | good |
| 4 | n-decyl alcohol | 10 | 84.5 | 74.8 | 7 | 8 | good |
| 5 | octyl alcohol | 6.5 | 83.2 | 74.7 | 7 | 8 | good |
| 6 | 2-ethylhexyl alcohol | 8 | 83.9 | 75.0 | 7 | 8 | good |
| 7 | 2-oxyethylene cetyl alcohol ether | 13 | 83.5 | 74.0 | 7 | 8 | good |
| 8 | 2-oxyethylene lauryl alcohol ether | 12 | 84.4 | 74.0 | 5 | 6 | good |
| 9 | 2-oxyethylene stearate | 9.5 | 84.1 | 74.9 | 6 | 7 | good |
| 10 | n-butyl laurate | 12 | 83.5 | 74.8 | 7 | 8 | good |
| 11 | diethyl sebacate | 6.5 | 83.0 | 75.2 | 7 | 8 | good |
| 12 | stearic acid | 17 | 82.5 | 75.3 | 5 | 6 | good |
| 13 | lauric acid | 13 | 83.2 | 75.5 | 7 | 8 | good |
| 14 | capric acid | 13.5 | 83.5 | 75.1 | 7 | 8 | good |

Table 1-continued

| Experiment No. | Agent providing inrreased ease of rupturability (Liquid Compenent II) | Treating time in swelling composition (sec) | Whiteness (surface S) (%) | Whiteness (surface S') (%) | Duplication property Ball pen writing | Typewriting | Printability |
|---|---|---|---|---|---|---|---|
| Comparative Example 1 | none | 18 | 83.4 | 74.2 | 3 | 4 | good |

Example 2

The same procedure as in Example 1 was followed using the same stretched laminate film as in Example 1, while using a swelling composition consisting of n-heptane and myristyl alcohol, and changing the concentration of myristyl alcohol. The results are shown in Table 2. In addition, however, in Experiment 3 of Example 2, after treating the laminate film in a swelling composition consisting of 70% n-heptance and 30% myristyl alcohol for 12 seconds at 45°C, the laminate film was immersed in n-heptane for 5 seconds at 16°C to remove the excess myristyl alcohol from the film.

Table 2

| Experiment No. | 1 | 2 | 3 |
|---|---|---|---|
| Concentration of myristyl alcohol (wt. %) | 1.5 | 3.0 | 30 |
| Treating time in swelling composition (sec) | 15 | 13 | 12 |
| Ammount of residual myristyl alcohol on the surface (S) (g/m²) | 0.1 | 0.2 | 0 |
| Whiteness (surface S) (%) | 83.0 | 83.2 | 82.7 |
| Whiteness (surface S') (%) | 74.9 | 75.0 | 75.2 |
| Ball pen writing | 6 | 7 | 7 |
| Typewriting | 7 | 8 | 8 |
| Printability | good | good | good |

Example 3 (and Comparative Example)

A laminate film composed of a surface layer (S) and a substrate (B) was biaxially stretched so that it was stretched three times in the longitudinal direction and four times in the width direction (stretching ratio of 12) at 125°C. The surface layer (S) had the same composition as that of the surface layer in Example 1 and the thickness thereof was 15 microns. The substrate (B) was made of a kneaded polymer of 79% of a styrene polymer the same as that of the surface layer (S), 20% high density polyethylene [specific gravity (23/23°C) 0.94 to 0.96 (ASTM D 792-50); melt index (g/10 min); 0.7 to 1.2 (ASTM D 1238-52T)] and 1% Phthalocyanine Blue.

To prevent curling of the treated film after treating with the solvent, both surfaces of the stretched laminate film were treated in a swelling composition of 4% octyl alcohol, 93% n-heptane, and 3% toluene at 40°C for 11 seconds and then the swelling composition attached to the surfaces of the film was removed by means of a squeeze roll at a pressure of 1.5 Kg/cm. Thereafter, for the purpose of obtaining a film having a good whiteness, the surface layer side (S) was further immersed in the above-described swelling composition at 40°C for 14 seconds. In this case, the back surface of the substrate (B) was covered with an insoluble polypropylene film to prevent the substrate from being brought into contact with the swelling composition. After the treatment was over, the laminate film was withdrawn from the bath and subjected to the same treatment as in Example 1.

As comparative example another sample was treated with a swelling composition of n-heptane and toluene. The results are shown in Table 3.

Table 3

| | Unit | Example 3 | Comparative Example 2 |
|---|---|---|---|
| Surface (S) whiteness | % | 83.2 | 83.5 |
| Suplication property | | | |
| Ball pen writing | | 6 | 3 |
| Typewriting | | 7 | 4 |
| Printability | | good | good |

Examples 4 to 6 (including Comparative Example 3)

A laminate film composed of a surface layer (S), a substrate layer (B) and a backing layer (S') was biaxially stretched at 128°C so that the length thereof in both of the longitudinal direction and the transverse direction became four times that of the original film (stretching ratio of 16). The surface layer (S) of the laminate film was made of a resin mixture composed of (1) 100 parts of a styrene polymer consisting of 94% styrene and 6% polybutadiene by weight, produced by bulk-suspension polymerization as disclosed in Japanese Patent Publication No. 22077/1965, having a melt flow rate of 2.2 g/10 min., and contained micro fine gel particles of rubbery polymer having a diameter of 0.1 to 10 microns composed mainly of butadiene (this styrene polymer is "HI/PS(A)" in the examples), and 0.5 part of polyethylene oxide having a molecular weight of 6,000. The thickness of the surface layer was 12 microns. The substrate layer (B) was made of 100 Parts of the HI/PS(A) styrene polymer and one part of Phthalocyanine Blue and the thickness of layer (B) was 23 microns. The backing surface layer (S') was also made of the HI/PS(A) styrene polymer and the thickness of the layer (S') was microns.

After immmersing the stretched laminate film in n-heptane at 45°C for 30 seconds, the film was withdrawn and dried in air at 25°C to remove the heptane from the surface of the film. The side of the surface layer (S) of the laminate film thus treated was further immersed in a swelling composition of 4 parts of myristyl alcohol and 96 parts of n-heptane for 20 seconds at 45°C. In this case, the backing layer side (S') was covered by a polypropylene film separately prepared to prevent the layer from being brought into contact with the swelling composition.

After the treatment was over, the laminate film was withdrawn from the bath, and after squeezing off the excess swelling composition attached to the surfaces of the film by means of squeeze roll under a pressure of 1.5 Kg/cm., the film was dried in air at 25°C to remove n-heptane. The insoluble film on the backing layer was then separated. The laminate film thus treated was evaluated, and the results are shown in Table 4.

In Example 5 below, the surface of the same stretched laminate film as in Example 4 was treated with n-heptane alone, i.e., the stretched laminate film as in Example 4 was immersed in n-heptance at 45°C for 30 seconds and then dried in air at 25°C to remove the n-heptane from the surface thereof. The surface layer side (S) of the laminate film thus treated was immersed in a bath of n-heptane at 45°C for 25 seconds. In this case, the backing layer (S') was also covered with an insoluble polypropylene film. The subsequent procedures were the same as in Example 4. The results are shown in Table 4.

In Example 6, the surface layer (S) of the stretched laminate film as in Example 4 was made of the systene polymer HI/PS(A) alone, that is, the surface layer (S) of the laminate layer was made of the HI/PS(A) styrene polymer and the thickness thereof was 12 microns. The substrate layer (B) was made of 100 parts of the sytrene polymer HI/PS(A) and one part of Phthalocyanine Blue and the thickness of the layer (B) was 23 microns. The backing layer (S') was made of the HI/PS(A) styrene polymer and the thickness thereof was 10 microns. The laminate film was biaxially stretched at 128°C as in Example 4 (stretching ratio of 16). After immersing the stretched laminate film in n-heptane at 45°C for 30 seconds, the film was withdrawn and dried in air at 25°C to remove the heptane. The surface layer side (S) of the laminate sheet thus treated was further immersed in a swelling composition of 4 parts of myristyl alcohol and 96 parts of n-heptane at 45°C for 25 seconds. In this case, the back layer (S') was covered by an insoluble polypropylene film. The sheet was then processed as in Example 4. The results are shown in Table 4.

In the following Comparative Example 3, the surface layer (S) of the laminate film in Example 6 above was treated with n-heptane alone, i.e., the same stretched laminate film as in Example 6 was immersed in n-heptane at 45°C for 30 seconds and then dried in air at 25°C to remove the heptane from the surfaces thereof. The surface layer (S) of the laminate film thus treated was further immersed in n-heptane at 45°C for 35 seconds. In this case the back surface layer (S') of the laminate film was also covered with an insoluble polypropylene film. The laminate film was then processed as in Example 4. The results obtained are shown in Table 4.

Table 4

|  | Example 4 | Example 5 | Example 6 | Comparative Example 3 |
|---|---|---|---|---|
| Surface whiteness (surface S) (%) | 86.2 | 86.4 | 86.3 | 85.0 |
| Back whiteness (surface S') (%) | 76.5 | 75.7 | 72.4 | 74.7 |
| Compression restorabililty (%) | 19.5 | 23.7 | 20.5 | 28.2 |

Table 4-continued

|  | Example 4 | Example 5 | Example 6 | Comparative Example 3 |
|---|---|---|---|---|
| Duplicating property (typewriten) | A | C | B | D |
| Printability | good | good | good | good |
| Surface layer | Kneaded mixture of HI/PS(A) and polyethylene oxide |  | HI/PS(A) |  |
| Surface treatment agent | Mixture of n-heptane and myristyl alcohol | n-heptane | Mixture of n-heptane and myristyl alcohol | n-heptane |

The terms used in the above Table 4 are as follows:
1. Whiteness: By the brightness L value, which was measured by means of an automatic color-difference meter.
2. Compression restorability:

$$= \frac{\text{(compression amount)} - \text{(plastic deformation amount)}}{\text{compression amount}}$$

3. Compression amount: = (thickness before compression)-(thickness when compressed with a load of 3.2 Kg/cm$^2$)

Plastic deformation amount: = (thickness before compression) - (thickness when the load is released).

4. Duplicating property (typewriting):

Six piled sheets of the laminate film were typed by means of an electric typewriter set for six sheet duplicates and the mark on the sixth sheet thus duplicated was evaluated. The evaluation was made by the following grades A–D.

| Grade in table | Duplication property | Duplicatable/number of sheets |
|---|---|---|
| A | very sharp | 11–8 |
| B | sharp | 8–6 |
| C | fairly sharp | 6–4 |
| D | unreadable | 2–1 |

Example 7

The stretched three-layer type laminate film as described in Example 4 was modified so the surface layer (S) was composed of a resin mixture of the styrene polymer HI/PS(A) and polyisobutylene, a petroleum resin, or an ethylene-vinyl acetate copolymer as shown in Table 5.

Each stretched laminate film was immersed in a n-heptane bath at 45°C for 30 seconds and then dried in air at 25°C to remove the heptane from the surfaces of the film. The surface layer (S) of the laminate film thus treated was further treated in the same swelling composition as in Example 4 for the time shown in Table 5. The results are shown in Table 5 together with those obtained by treating the surface layer (S) with n-heptane alone.

Table 5

| | Composition of Surface layer(S) (parts by weight) | Treatment Side (S) Kind of treating liquid | Time (sec) | Surface whiteness side (S) (%) | Back whiteness side (S') (%) | Duplicating property |
| --- | --- | --- | --- | --- | --- | --- |
| Example 7A | HI/PS(A) 100 Polyisobutylene (molecular wt.470) 0.5 | M | 22 | 87.0 | 75.0 | A |
| Example 7B | The same as above | H | 27 | 86.9 | 74.1 | C |
| Example 7C | HI/PS(A) 100 Petroleum resin (softening point 90°C) 0.5 | M | 25 | 86.2 | 73.5 | A |
| Example 7D | The same as above | H | 30 | 86.2 | 72.4 | C |
| Example 7E | HI/PS(A) 100 Ethylene vinyl acetate copolymer (vinyl acetate content 40% melt index 55) 0.5 | M | 19 | 87.3 | 76.0 | A |
| Example 7F | The same as above | H | 24 | 86.7 | 73.9 | C |

In Table 6, the kinds of the liquids used for treating the surface layer (S) were as follows:

M: A swelling compsotion of 96% n-heptane and 4% myristyl

H: n-heptane alone as a swelling agent

Example 8

A laminate film composed of a surface layer (S), a substrate layer (B) and a backing layer (S') having the compositions described below was biaxially stretched at 128°C as in Example 4 (stretching ratio being 16). The surface layer (S) was composed of a resin mixture of 100 parts of the styrene polymer (HI/PS(A) and 5 to 10 parts of the ethylene-vinyl acetate copolymer shown in Table 6 and the thickness of the layer (S) was 12 microns. The substrate layer (B) was made of 100 parts of the HI/PS(A) styrene polymer and one part of Phthalocyanine Blue and the thickness of the layer (B) was 23 microns. The back layer (S') was made of the HI/PS(A) styrene polymer and the thickness of the layer (S') was 10 microns.

The surface layer side (S) of the stretched laminate film was immersed in a swelling composition of 7 parts of myristyl alcohol and 93 parts of n-heptane at 45°C for the time shown in Table 6. On the other hand, the back layer side (S') of the laminate film was imersed in n-heptane at 45°C for 30 seconds. In these treatments, the opposite or non-treated surface of the laminate film was covered by a polypropylene film since the swelling composition is different from the composition of the solvent for treating the back layer.

After the treatment by the swelling composition or the solvent was over, the laminate film was withdrawn from the bath and the excess agent attached to the surfaces of the film was squeezed off by means of a squeeze roll at a pressure of 1.5 Kg/cm. Thereafter, the laminate film thus treated was dried in air, the insoluble film was separated, and then a mixture of 7 parts of titanium oxide, 3 parts of alumina sol, 3 parts of polyvinyl acetate and 60 parts of water was applied to the back layer (S') of the film uniformly followed by drying in air at 30°C to provide a coating layer having a solids content of 3 g/m². The results of the duplicating test are shown in Table 6.

Table 6

| | Ethylene-vinyl acetate copolymer | | | | | | |
| --- | --- | --- | --- | --- | --- | --- | --- |
| | Vinyl acetate content (%) | Melt index (g/10 min) | Kneaded amount wt.parts | Immersion time | Surface whiteness (surface S) (%) | Back whiteness (surface S') (%) | Duplicating property |
| Example 8A | 33 | 25 | 5 | 16 | 86.8 | 82.5 | A |
| Example 8B | 28 | 15 | 10 | 12 | 87.2 | 83.0 | A |
| Example 8C | 25 | 2 | 5 | 18 | 86.9 | 82.3 | A |

Example 9

A laminate film composed of a surface layer (S) and a substrate layer (B) having the following compositions was biaxially stretched at 128°C as in Example 4 (stretching ratio of 16). The surface layer (S) of the laminate film was made of 100 parts of HI/PS(A) and 3 parts of an ethylene-vinyl acetate copolymer having a vinyl acetate content of 40% and a melt index of 55 and the thickness of the layer (S) was 13 microns. The substate layer (B) was made of 100 parts of HI/PS(A) and one part of Phthalocyanine Blue and the thickness of the layer (B) was 37 microns.

The stretched laminate film was immersed in n-heptane at 45°C for 30 seconds and then dried in air at 25°C to remove the heptane from the surface. The surface layer side (S) of the laminate film thus treated was further immersed in a swelling composition of 95% of n-heptane and 5% of the liquid component II shown in Table 7 at 45°C. In this case, the substrate layer side (B) was covered by a polypropylene film prepared separately to prevent the layer from being brought into contact with the swelling composition.

After the treatment was over, the laminate film was withdrawn from the bath and subjected to the same procedures as in Example 5. The results are shown in Table 7.

Table 7

| Example No. | 9A | 9B | 9C | 9D |
|---|---|---|---|---|
| Liquid component (II) | Octyl alcohol | 2-oxyethylene acetyl alcohol ether | n-butyl laurate | lauric acid |
| Immersion time (sec) | 13 | 20 | 18 | 20 |
| Surface whiteness (side S) (%) | 86.5 | 86.1 | 85.8 | 86.7 |
| Duplicating property (typewriting) | A | A | A | A |
| Printability (surface S) | good | good | good | good |

Example 10

A laminate film composed of a surface layer (S) and substrate layer (B) having the following compositions was biaxially stretched at 128°C as in Example 4 (stretching ratio of 16). The surface layer (S) of the laminate film was made of 100 parts of HI/PS(A) and 5 parts of an ethylene-vinyl acetate-glycidyl methacrylate terpolymer having a vinyl acetate content of 35%, a glycidyl methacrylate content of 5% and a Vicat softening point of about 40°C. The thickness of the layer (S) was 13 microns. The substrate layer (B) was made of 100 parts of HI/PS(A) and one part of phthalocyanine Blue and the thickness of layer (B) was 37 microns.

The surface layer side (S) of the laminate film was immersed in a swelling composition of 95% of n-heptane and 5% of myristyl alcohol at 45°C for 18 seconds. In this case, the substrate layer side (B) was covered by a polypropylene film prepared separately to prevent the layer from being brought into contact with the swelling composition.

After the treatment was over, the laminate film was withdrawn from the bath and subjected to the same procedures as in Example 5. The results are shown in Table 8.

Table 8

| Surface whiteness (%) | 84.1 |
|---|---|
| Duplicating property (type writing) | A |
| printablity | good |

While the invention has been described in detail and in terms of specific embodiments thereof, it will be apparent that various changes and modifications can be made therein without departing from the spirit and scope thereof.

What is claimed is:

1. In a process for manufacturing an autogeneous self-marking pressure sensitive recording sheet comprising the thermoplastic, colored resin substrate having adhered thereto a surface layer of a different color from the substrate, which surface layer exhibits a writing surface comprising a plurality of microvoids, comprising the steps of:
    contacting the surface layer, the surface layer comprising a polymer of styrene and uniformly dispersed fine particles of rubbery polymer, the surface layer being at least uniaxially stretched to deform the fine particles of rubbery polymer, the fine particles of rubbery polymer being retained in the deformed state in the styrene polymer film, with a swelling agent for the polymer of styrene for a period of time and at a temperature sufficient to swell at least the surface of the surface layer, whereby the fine particles of rubbery polymer which were deformed by the stretching are no longer retained in the deformed state because the swelling softens the styrene polymer and releases the retaining force on the fine particles, which, due to their rubbery nature, return to their original nondeformed shape and create microvoids in the surface layer, rendering the surface layer opaque, the improvement wherein:
    the swelling agent contains a component soluble therein which does not dissolve the polymer of styrene at 45°C and which meets the formula $T_o - T > 3$ seconds.
    where $T_o$=time in seconds for a test surface layer treated in n-heptane to reach a whiteness value (Lvalue) of 83±2% and $T$= time in seconds for the same test surface layer treated in n-heptane with 2-10% of the component to reach a surface whiteness (L value) of 83±2%;
    the test surface layer used to determine compliance with the formula consisting of 94% by weight polymer of styrene component and 6% by weight of polybutadiene component, having fine particles of a size of 0.1 to 10$\mu$ uniformly dispersed therein, the test surface layer having a melt index of 2.2g/10 min., 18 – 19 wt% of insolubles in toluene and the polymer of styrene component having an $[\eta]_{toluene}^{30} = 0.8$,
    the test surface layer being laminated to a substrate of the same composition but containing 1% Phthalocyanine Blue,
    the laminate being simultaneously biaxially stretched at 128°C 4X in the longitudinal and width directions, whereby the test surface layer and substrate thicknesses after stretching are 12$\xi$ and 23$\xi$, respectively; whereby the crushability of the surface layer is increased.

2. The process of claim 1 where the component is an organic liquid or solid soluble in the swelling agent and present in an amount of from about 0.5 to about 50% by weight based on the weight of swelling agent used.

3. The process of claim 2 where the component is an alcohol, fatty acid, ester or compatible mixture thereof.

4. The process of claim 3 where the component is:
    an alcohol of the formula R — OH where R is a $C_2$ - $C_{18}$ aliphatic hydrocarbon group;
    an ether alcohol of the formula $R^1$—O—$(R^2O)_nH$ where $R^1$ is a $C_8$ - $C_{18}$ aliphatic hydrocarbon group, $R^2$ is a $C_2$ - $C_3$ divalent aliphatic hydrocarbon group and $n$ is an integer of 1 - 7;
    a fatty acid of the formula $R^3$—CO—OH where $R^3$ is a $C_1$ - $C_{17}$ hydrocarbon group;
    an ester of the formula $R^4$—CO—O—$R^5$ where $R^4$ is a $C_1$ - $C_{17}$ aliphatic hydrocarbon group and $R^5$ is a $C_1$ - $C_{18}$ aliphatic hydrocarbon group;
    an ester of the formula $R^6$—O—OC—$R^7$—CO—$R^8$ where $R^6$ and $R^8$ are $C_2$ - $C_{18}$ aliphatic hydrocarbon groups and $R^7$ is a $C_6$- $C_{16}$ divalent hydrocarbon group;
    or a compatible mixture thereof.

5. The process of claim 1 wherein more than 50%, by total particle number, of ssaid fine particles of a rubbery polymer have an average particle diameter of from about 0.1 to about 10 microns.

6. The process of claim 5 wherein the surface layer, has a melt flow rate of about 0.1 to about 3 g/10 min.- (ASTM-D1238).

7. The process of claim 6 wherein the rubbery polymer is from about 1 to about 15% by weight of the weight of the styrene polymer.

8. The process of claim 7 wherein the rubbery polymer has a Mooney viscosity of about 20 to about 150.

9. The process of claim 8 wherein the polymer of styrene has a molecular weight, wieght average, of about 150,000 to about 400,000, a Vicat softening point (ASTM D-1525) of 80°–110°C and a Rockwell hardness (ASTM D-785) of 80 – 100.

10. The process of claim 9 where the stretching ratio ranges from about 6 to about 40.

11. The process of claim 10 wherein the stretching temperature of said at least uniaxial stretching is higher than the secondary transition point of at least the surface layer and is lower than the flow temperature of at least the surface layer.

12. The process of claim 11 where both the surface layer and the substrate are stretched, and the lower limit of the stretching temperature is the highest temperature of the secondary transition temperature of the surface layer or substrate and upper limit is the lowest temperature of the flow temperature of the surface layer or substrate.

13. The process of claim 12 wherein the stretching is a biaxial stretching.

14. The process of claim 11 wherein the contact with the swelling agent is at a temperature higher than about 35°C but below the temperature at which the laminate film is deformed so that it cannot be used as a synthetic paper or below the boiling temperature of the agent.

15. The process of claim 14 wherein the contact of the swelling agent is at a temperature for a time sufficient to provide an L value of from about 60% to about 98%.

16. The process of claim 9 wherein the polymer of styrene is a homopolymer of styrene.

17. The process of claim 9 where the polymer of styrene is a copolymer of styrene with a monomer copolymerizable therewith, the monomer being present in an amount less than 50 mole percent of the copolymer of styrene.

18. The process of claim 1 wherein a resin backing layer is applied to the substrate on the side surface opposite the surface layer.

19. The process of claim 1 where only the surface layer is contacted with the swelling composition.

20. The process of claim 18 where both the surface layer and resin backing layer are contacted with the swelling composition.

21. The process of claim 20 where, after contact with the swelling composition, the resin backing layer is coated with a thin resin layer of a resin or a resin containing filler wherein the coating has a coated film hardness of 10 to 30 (JIS K-5400).

22. The process of claim 21 where the resin-filler coating has a coated film hardness of about 15 to about 25 (JIS K-5400).

23. The process of claim 22 wherein the resin filler coating comprises from 100 to 15% by weight of resin based on weight of resin plus filler.

24. The process of claim 23 wherein the resin filler coating comprises a resin which is an adhesive or a thermosetting resin, which termosetting resin hardens at about 50° to about 80°C, and which adhesive resin is selected from the group consisting of nitrile copolymers of olefinic unsaturated acids, methyl methacrylic acid-acrylonitrile copolymers, methyl methacrylic acid-methacrylonitrile copolymers and acrylic acid ester copolymers.

25. The process of claim 24 where the resin in the resin-filler coating is a nitrile copolymer of an olefinic unsaturated acid, an urea-formaldehyde condensate, a melamine-formaldehyde condensate — or an acrylic acid ester copolymer.

26. The process of claim 1 where the color difference between the surface layer and substrate is at least 3.0 (NBS).

27. The process of claim 1 wherein the recording sheet consists essentially of the following layers, a writing surface layer being given initially and the remaining layer(s) being given in order of sequence thereunder: surface layer exhibiting a surface comprising a plurality of microvoids; and colored thermoplastic resin substrate.

28. The process of claim 1 wherein the recording sheet consists essentially of the following layers, a writing surface layer being given initially and the remaining layer(s) being given in order of sequence thereunder: surface layer exhibiting a surface comprising a plurality of microvoids; colored thermoplastic resin substrate; and a resin layer without microvoids.

29. The process of claim 1 wherein the recording sheet consists essentially of the following layers, a writing surface layer being given initially and the remaining layer(s) being given in order of sequence thereunder: surface layer exhibiting a surface comprising a plurality of microvoids; colored thermoplastic resin substrate; and resin coating or resin containing filler-coating having a coated film hardness of about 10 to about 30 (JIS K-5400).

30. The process of claim 1 wherein the recording sheet consists essentially of the following layers, a writing surface layer being given initially and the remaining layer(s) being given in order of sequence thereunder: surface layer exhibiting a surface comprising a plurality of microvoids; colored thermoplastic resin substrate; a resin layer without microvoids; and resin coating or resing containing filler coating having a coated film hardness of about 10 to about 30 (JIS K-5400).

31. The process of claim 1 wherein the recording sheet consists essentially of the following layers, a writing surface layer being given initially and the remaining layer(s) being given in order of sequence thereunder: surface layer exhibiting a surface comprising a plurality of microvoids; colored thermoplastic resin substrate; a resin layer which exhibits a surface comprising a plurality of microvoids; and resin coating or resin containing filler coating having a coated film hardness of about 10 to 30 (JIS K-5400).

32. The process of claim 1 wherein the recording sheet consists essentially of the following layers, a writing surface layer being given initially and the remaining layer(s) being given in order of sequency thereunder: surface layer exhibiting a surface comprising a plurality of microvoids; colored thermoplastic resin substrate; and a resin layer which exhibits a surface comprising a plurality of microvoids.

33. The process of claim 3 wherein the component is ether alcohol.

34. In the process of claim 1, wherein the improvement is further comprised in that the surface layer further contains a resin, in an amount of less than 15% by weight based on the weight of the surface layer, different from the fine particles of rubbery polymer which is softer than the polymer of styrene and which has a lower softening point than the polymer of styrene and which satisfies the following formula:

$T_o - T > 3$ seconds:

wherein $T_o$ = time in seconds for a test surface layer treated in n-heptane at 45°C to reach a whiteness value (L value) of 83 ± 2%;

and $T$ = time in seconds for the same test surface layer but containing 5% of the resin, based on surface layer weight, treated in n-heptane at 45°C to reach a whiteness value (L value) of 83 ± 2%;

the test surface layer used to determine compliance with the formula consisting of 94% by weight polymer of styrene component and 6% by weight of polybutadiene component, having fine particles of a size of 0.1 to 10μ uniformly dispersed therein, and having a melt index of 2.2g/10 min., 18 – 19 wt% of insolubles in toluene and the polymer of styrene component having an $[\eta]$toluene $_{30}$ = 0.8, the test surface layer being laminated to a substrate of the same composition but containing 1% Phthalocyanine Blue:

the laminate being simultaneously biaxially stretched at 128°C 4×in the longitudinal and width directions, whereby the test surface layer and substrate thicknesses after stretching are 12μ and 23μ, respectively; whereby the crushability of the surface layer is increased.

35. The process of claim 34, wherein the resin has a Shore hardness of less than 90° (JIS K 6301) and a Vacat softening point of less than 60°C (ASTM D-785).

36. The process of claim 35, wherein the resin is selected from the group consisting of polyethylene oxide, olefin-polar vinyl monomer copolymers, polyisobutylene or a petroleum resin.

37. The process of claim 34, where the component is an organic liquid or solid soluble in the swelling agent and present in an amount of from about 0.5 to about 50% by weight based on the weight of swelling agent used.

38. The process of claim 37, where the component is an alcohol, fatty acid, ester or compatible mixture thereof.

39. The process of claim 38, where the component is:
an alcohol of the formula R—OH where R is a $C_2$-$C_{18}$ aliphatic hydrocarbon group;
an ether alcohol of the formula $R^1$—O—$(R^2O)_nH$ where $R^1$ is a $C_8$-$C_{18}$ aliphatic hydrocarbon group, $R^2$ is a $C_2$-$C_3$ divalent aliphatic hydrocarbon group and n is an integer of 1–7;
a fatty acid of the formula $R^3$—CO—OH where $R^3$ is a $C_1$-$C_{17}$ hydrocarbon group;
an ester of the formula $R^4$—CO—O—$R^5$ where $R^4$ is a $C_1$-$C_{17}$ aliphatic hydrocarbon group and $R^5$ is a $C_1$-$C_{18}$ aliphatic hydrocarbon group;
an ester of the formula $R^6$—O—OC—$R^7$—CO—$R^8$ where $R^6$ and $R^8$ are $C_2$-$C_{18}$ aliphatic hydrocarbon groups and $R^7$ is a $C_6$-$C_{16}$ divalent hydrocarbon group;
or a compatible mixture thereof.

40. The process of claim 34, wherein more than 50%, by total particle number, of said fine particles of a rubbery polymer have an average particle diamter of from about 0.1 to about 10 microns.

41. The process of claim 40, wherein the surface layer has a melt flow rate of about 0.1 to about 3 g/10 min. (ASTM-D1238).

42. The process of claim 41, wherein the rubbery polymer is from about 15% by weight of the weight of the styrene polymer.

43. The process of claim 42, wherein the rubbery polymer has a Mooney viscosity of about 20 to about 150.

44. The process of claim 43, wherein the polymer of styrene has a molecular weight, weight average, of about 150,000 to about 400,000, a Vicat softening point (ASTM D-1525) of 80°–110°C and a Rockwell hardness (ASTM D-785) of 80-100.

45. The process of claim 44, where the stretching ratio ranges from about 6 to about 40.

46. The process of claim 45, wherein the stretching temperature of said at least uniaxial stretching is higher than the secondary transition point of at least the surface layer and is lower than the flow temperature of at least the surface layer.

47. The process of claim 46, where both the surface layer and the substrate are stretched and the lower limit of the stretching temperature is the highest temperature of the secondary transition temperature of the surface layer or substrate and upper limit is the lowest temperature of the flow temperature of the surface layer or substrate.

48. The process of claim 47, wherein the stretching is a biaxial stretching.

49. The process of claim 46, wherein the contact with the swelling agent is at a temperature higher than about 35°C but below the temperature at which the laminate film is deformed so that it cannot be used as a synthetic paper or below the boiling temperature of the agent.

50. The process of claim 49, wherein the contact of the swelling agent is at a temperature for a time sufficient to provide an L value of from about 60% to about 98%.

51. The process of claim 44, where the polymer of styrene is a homopolymer of styrene.

52. The process of claim 44, where the polymer of styrene is a copolymer of styrene with a monomer copolymerizable therewith, the monomer being present in an amount less than 50 mol percent of the copolymer of styrene.

53. The process of claim 36, where the polar vinyl monomer comprises about 12 to about 40% by weight of the copolymer, based on olefin weight.

54. The process of claim 34, where a resin backing layer is applied to the substrate on the side opposite the surface layer.

55. The process of claim 34, where only the surface layer is contacted with the swelling composition.

56. The process of claim 54, where both the surface layer and resin backing layer are contacted with the swelling composition.

57. The process of claim 56, where, after contact with the swelling composition, the resin backing layer is coated with a thin resin layer of a resin or resin containing filler wherein the coating has a coated film hardness of about 10 to 30 (JIS K-5400).

58. The process of claim 57, where the resin-filler coating has a coated film hardness of about 15 to about 25 (JIS K-5400).

59. The process of claim 58, wherein the resin filler coating comprises from 100 to 15% by weight of resin based on weight of resin plus filler.

60. The process of claim 59, where the resin filler coating comprises a resin which is an adhesive or a thermosetting resin, which thermosetting resin hardens at about 50° to about 80°C, and which adhesive resin is selected from the group consisting of nitrile copolymers of olefinic unsaturated acids, methyl methacrylic acid-acrylonitrile copolymers, methyl methacrylic acid-methacrylonitrile copolymers and acrylic acid ester copolymers.

61. The process of claim 60, where the resin in the resin filler coating is a nitrile copolymer of an olefinic unsaturated acid, an urea-formaldehyde condensate, a melamine-formaldehyde condensate — or an acrylic acid ester copolymer.

62. The process of claim 34, where the color difference between the surface layer and substrate is at least 3.0 (NBS).

63. The process of claim 34, wherein the recording sheet consists essentially of the following layers, a writing surface layer being given initially and the remaining layer(s) being given in order of sequence thereunder; surface layer exhibiting a surface comprising a plurality of microvoids; and colored thermoplastic resin substrate.

64. The process of claim 34, wherein the recording sheet consists essentially of the following layers, a writing surface layer being given initially and the remaining layer(s) being given in order of sequence thereunder: surface layer exhibiting a surface comprising a plurality of microvoids; colored thermoplastic resin substrate; and a resin layer without microvoids.

65. The process of claim 34, wherein the recording sheet consists essentially of the following layers, a writing surface layer being given initially and the remaining layer(s) being given in order of sequence thereunder: surface layer exhibiting a surface comprising a plurality of microvoids; colored thermoplastic resin substrate; and resin or resin containing filler coating having a coated film hardness of about 10 to about 30 (JIS K-5400).

66. The process of claim 34, wherein the recording sheet consists essentially of the following layers, a writing surface layer being given initially and the remaining layer(s) being given in order of sequence thereunder: surface layer exhibiting a surface comprising a plurality of microvoids; colored thermoplastic resin substrate; a resin layer without microvoids, and resin or resin containing filler coating having a coated film hardness of about 10 to about 30 (JIS K-5400).

67. The process of claim 34, wherein the recording sheet consists essentially of the following layers, a writing surface layer being given initially and the remaining layer(s) being given in order of sequence thereunder: surface layer exhibiting a surface comprising a plurality of microvoids; colored thermoplastic resin substrate; a resin layer which exhibits a surface comprising a plurality of microvoids; and resin or resin containing filler coating having a coated film hardness of about 10 to about 30 (JIS K-5400).

68. The process of claim 34, wherein the recording sheet consists essentially of the following layers, a writing surface layer being given initially and the remaining layer(s) being given in order of sequence thereunder: surface layer exhibiting a surface comprising a plurality of microvoids; colored thermoplastic resin substrate; and a resin layer which exhibits a surface comprising a plurality of microvoids.

69. The process of claim 38 wherein the component is ether alcohol.

70. In a process for manufacturing a autogeneous self-marking pressure sensitive recording sheet comprising a thermoplastic, colored resin substrate having adhered thereto a surface layer of a different color from the substrate, which layer exhibits a writing surface comprising a plurality of microvoids, comprising the steps of:

contacting the surface layer, the surface layer comprising a polymer of styrene and uniformly dispersed fine particles of rubbery polymer, the surface layer being at least uniaxially stretched to deform the fine particles of rubbery polymer, the fine particles of rubbery polymer being retained in the deformed state in the styrene polymer film, with a swelling agent for the polymer of styrene for a period of time and at a temperature sufficient to swell at least the surface of the surface layer, whereby the fine particles of rubbery polymer which were deformed by the stretching are no longer retained in the deformed state because the swelling softens the styrene polymer and releases the retaining force on the fine particles, which, due to their rubbery nature, return to their original non-deformed shape and create microvoids in the surface layer, rendering the surface layer opaque, the improvement wherein:

the surface layer further contains a resin, in an amount of less than 15% by weight based on the weight of the surface layer, different from the fine particles of rubbery polymer which is softer than the polymer of styrene and which has a lower softening point than the polymer of styrene and which satisfies the following formula:

$T_o - T > 3$ seconds wherein $T_o =$ time in seconds for a test surface layer treated in n-heptane at 45°C to reach a whiteness value (L value) of $83 \pm 2\%$;

and $T =$ time in seconds for the same test surface layer but containing 5% of the resin, based on surface layer weight, treated in n-heptane at 45°C to reach a whiteness value (L value) of $83 \pm 2\%$;

the test surface layer used to determine compliance with the formula consisting of 94% by weight polymer of styrene component and 6% by weight of polybutadiene component, having fine particles of a size of 0.1 to 10$\mu$ uniformly dispersed therein, and having a melt index of 2.2g/10 min., 18 – 19 wt% of insolubles in toluene and the polymer of styrene component having an $[\eta]$ toluene $^{30} = 0.8$, the test surface layer being laminated to a substrate of the same composition but containing 1% Phthalocyanine Blue;

the laminate being simultaneously biaxially stretched at 128°C 4× in the longitudinal and width directions, whereby the test surface layer and substrate thicknesses after stretching are 12$\mu$ and 23$\mu$, respectively: whereby the crushability of the surface layer is increased.

71. The process of claim 70 wherein the resin has a Shore hardness of less than 90° (JIS K 6301) and a Vicat softening point of less than 60°C (ASTM D-785).

72. The process of claim 71, wherein the resin is selected from the group consisting of polyethylene oxide, olefin-polar vinyl monomer copolymers, polyisobutylene or a petroleum resin.

73. The process of claim 72 where the olefin - polar vinyl monomer copolymer is an olefin - acrylic acid copolymer or an olefin vinyl ester copolymer.

74. The process of claim 72 where the polar vinyl monomer comprises about 12 to about 40% by weight of the copolymer, based on olefin weight.

75. The process of claim 70, wherein more than 50%, by total particle number, of said fine particles of a rubbery polymer have an average particle diameter of from about 0.1 to about 10 microns.

76. The process of claim 75, wherein the surface layer has a melt flow rate of about 0.1 to about 3 g/10 min. (ASTM-D1238).

77. The process of claim 76, wherein the rubbery polymer is from about 15% by weight of the weight of the styrene polymer.

78. The process of claim 77, wherein the rubbery polymer has a Mooney viscosity of about 20 to about 150.

79. The process of claim 78, wherein the polymer of styrene has a molecular weight, weight average, of about 150,000 to about 400,000, a Vicat softening point (ASTM D-1525) of 80°–110°C and a Rockwell hardness (ASTM D-785) of 80–100.

80. The process of claim 79 where the stretching ratio ranges from about 6 to about 40.

81. The process of claim 80, wherein the stretching temperature of said at least uniaxial stretching is higher than the secondary transition point of at least the surface layer and is lower than the flow temperature of at least the surface layer.

82. The process of claim 81, where both the surface layer and the substrate are stretched, and the lower limit of the stretching temperature is the highest temperature of the secondary transition temperature of the surface layer or substrate and upper limit is the lowest temperature of the flow temperature of the surface layer or substrate.

83. The process of claim 82, wherein the stretching is a biaxial stretching.

84. The process of claim 81, wherein the contact with the swelling agent is at a temperature higher than about 35°C but below the temperature at which the laminate film is deformed so that it cannot be used as a synthetic paper or below the boiling temperature of the agent.

85. The process of claim 84, wherein the contact of the swelling agent is at a temperature for a time sufficient to provide an L value of from about 60% to about 98%.

86. The process of claim 79, where the polymer of styrene is a homopolymer of styrene.

87. The process of claim 79, where the polymer of styrene is a copolymer of styrene with a monomer copolymerizable therewith, the monomer being present in an amount less than 50 mol percent of the copolymer of styrene.

88. The process of claim 36, where the olefin-polar vinyl monomer copolymer is an olefin-acrylic acid copolymer or an olefin vinyl ester copolymer.

89. The process of claim 70 where a resin backing layer is applied to the substrate on the side opposite the surface layer.

90. The process of claim 70, where only the surface layer is contacted with the swelling composition.

91. The process of claim 89, where both the surface layer and resin backing layer are contacted with the swelling composition.

92. The process of claim 91 where, after contact with the swelling composition, the resin backing layer is coated with a thin resin layer of a resin or resin containing filler wherein the coating has a coated film hardness of about 10 to 30 (JIS K-5400).

93. The process of claim 92, where the resin-filler coating has a coated film hardness of about 15 to about 25 (JIS K-5400).

94. The process of claim 93, wherein the resin filler coating comprises from 100 to 15% by weight of resin based on weight of resin plus filler.

95. The process of claim 94, where the resin filler coating comprises a resin which is an adhesive or a thermosetting resin, which thermosetting resin hardens at about 50° to about 80°C, and which adhesive resin is selected from the group consisting of nitrile copolymers of olefinic unsaturated acids, methyl methacrylic acid-acrylonitrile copolymers, methyl methacrylic acid-methacrylonitrile copolymers and acrylic acid ester copolymers.

96. The process of claim 95, where the resin in the resin filler coating is a nitrile copolymer of an olefinic unsaturated acid, an urea-formaldehyde condensate, a melamine-formaldehyde condensate - or an acrylic acid ester copolymer.

97. The process of claim 70, where the color difference between the surface layer and substrate is at least 3.0 (NBS).

98. The process of claim 70, wherein the recording sheet consists essentially of the following layers, a writing surface layer being given initially and the remaining layer(s) being given in order of sequence thereunder: surface layer exhibiting a surface comprising a plurality of microvoids; and colored thermoplastic resin substrate.

99. The process of claim 70, wherein the recording sheet consists essentially of the following layers, a writing surface layer being given initially and the remaining layer(s) being given in order of sequence thereunder: surface layer exhibiting a surface comprising a plurality of microvoids; colored thermoplastic resin substrate; and a resin layer without microvoids.

100. The process of claim 70, wherein the recording sheet consists essentially of the following layers, a writing surface layer being given initially and the remaining layer(s) being given in order of sequence thereunder: surface layer exhibiting a surface comprising a plurality of microvoids; colored thermoplastic resin substrate; and resin or resin containing filler coating having a coated film hardness of about 10 to about 30 (JIS K-5400).

101. The process of claim 70, wherein the recording sheet consists essentially of the following layers, a writing surface layer being given initially and the remaining layer(s) being given in order of sequence thereunder: surface layer exhibiting a surface comprising a plurality of microvoids; colored thermoplastic resin substrate; a resin layer without microvoids; and resin or resin containing filler coating having a coated film hardness of about 10 to about 30 (JIS K-5400).

102. The process of claim 70, wherein the recording sheet consists essentially of the following layers, a writing surface layer being given initially and the remaining layer(s) being given in order of sequence thereunder: surface layer exhibiting a surface comprising a plurality of microvoids; colored thermoplastic resin substrate; a resin layer which exhibits a surface comprising a plurality of microvoids; and resin or resin containing filler coating having a coated film hardness of about 10 to about 30 (JIS K-5400).

103. The process of claim 70, wherein the recording sheet consists essentially of the following layers, a writing surface layer being given initially and the remaining layer(s) being given in order of sequence thereunder: surface layer exhibiting a surface comprising a plurality of microvoids; colored thermoplastic resin substrate; and a resin layer which exhibits a surface comprising a plurality of microvoids.

* * * * *

UNITED STATES PATENT AND TRADEMARK OFFICE
CERTIFICATE OF CORRECTION

PATENT NO. : 3,928,099
DATED : December 23, 1975
INVENTOR(S) : Hiro OHOTSUBO et al It is certified that error appears in the above-identified patent and that said Letters Patent are hereby corrected as shown below:

IN THE HEADING:

ADD:

Foreign Application Priority Data

| July 18, 1972 | Japanese | 47-71842 |
| July 18, 1972 | Japanese | 47-71843 |

Signed and Sealed this sixteenth Day of March 1976

[SEAL]

Attest:

RUTH C. MASON
Attesting Officer

C. MARSHALL DANN
Commissioner of Patents and Trademarks